United States Patent
Furr

(10) Patent No.: US 8,857,404 B2
(45) Date of Patent: Oct. 14, 2014

(54) HIGH EFFICIENCY INTERNAL EXPLOSION ENGINE

(76) Inventor: Douglas K. Furr, Salt Lake City, UT (US)

(*) Notice: Subject to any disclaimer, the term of this patent is extended or adjusted under 35 U.S.C. 154(b) by 0 days.

(21) Appl. No.: 13/533,868

(22) Filed: Jun. 26, 2012

(65) Prior Publication Data

US 2013/0008408 A1 Jan. 10, 2013

Related U.S. Application Data

(63) Continuation of application No. 12/396,436, filed on Mar. 2, 2009, now Pat. No. 8,215,280.

(60) Provisional application No. 61/067,638, filed on Feb. 28, 2008.

(51) Int. Cl.
*F02B 75/32* (2006.01)
*F16C 3/22* (2006.01)
*F16C 7/02* (2006.01)
*F02D 15/04* (2006.01)
*F16C 3/06* (2006.01)
*F02B 75/04* (2006.01)
*F02B 75/02* (2006.01)

(52) U.S. Cl.
CPC ...... *F16C 3/06* (2013.01); *F16C 3/22* (2013.01); *Y02T 10/12* (2013.01); *F16C 7/023* (2013.01); *F02D 15/04* (2013.01); *F02B 75/042* (2013.01); *F02B 2075/027* (2013.01)
USPC .................. 123/197.4; 123/197.1; 123/197.3; 74/579 E; 74/595

(58) Field of Classification Search
USPC ............... 123/197.1, 197.3, 197.4; 74/579 R, 74/579 E, 595, 603
See application file for complete search history.

(56) References Cited

U.S. PATENT DOCUMENTS 1,309,917 A * 7/1919 Tanaka ............................ 74/602
1,805,931 A * 5/1931 Taylor ........................ 123/47 R (Continued)

FOREIGN PATENT DOCUMENTS

CA 2 476 167 A1 2/2006
CN 101076682 A 11/2007

(Continued)

OTHER PUBLICATIONS

Holubowicz, "Gun-Engine", www.gun-amine.info, Jul. 2004, pp. 1-4.

(Continued)

*Primary Examiner* — Noah Kamen
*Assistant Examiner* — Grant Moubry
(74) *Attorney, Agent, or Firm* — David B. Tingey; Kirton McConkie

(57) ABSTRACT

A piston-powered internal explosion engine for providing power output through a rotating crankshaft. The engine includes an engine block having power cylinders for receiving working pistons, bearing means for supporting the crankshaft, and a crankshaft supported within the bearing means having an output end extending outside of the engine block and a plurality of offset power cranks. The engine includes connecting rods operably coupled to the power cranks and configured to transfer power from the working pistons to rotate the crankshaft, and working pistons that are received into the power cylinders and operably coupled to the power cranks. Each working piston has a head end positioned adjacent to a cylinder head to form a compression chamber and is configured to receive power from an explosion of a compressed volume located within the compression chamber, and to transfer the received power to the connecting rods.

6 Claims, 18 Drawing Sheets

(56) References Cited

U.S. PATENT DOCUMENTS

| | | | | |
|---|---|---|---|---|
| 1,914,707 | A * | 6/1933 | Milton | 123/78 D |
| 1,974,851 | A * | 9/1934 | Hurst | 123/459 |
| 2,400,747 | A * | 5/1946 | Fisher | 123/48 AA |
| 2,574,934 | A * | 11/1951 | Perry | 74/44 |
| 2,816,416 | A * | 12/1957 | French | 60/543 |
| 2,897,801 | A * | 8/1959 | Kloss | 123/41.12 |
| 2,914,047 | A * | 11/1959 | Colton | 123/48 AA |
| 3,083,635 | A * | 4/1963 | O'Hare | 100/223 |
| 3,096,615 | A * | 7/1963 | Zuhn | 60/606 |
| 3,172,596 | A * | 3/1965 | King | 417/364 |
| 3,432,088 | A * | 3/1969 | Steiger | 417/5 |
| 3,578,533 | A * | 5/1971 | Loynd | 156/436 |
| 3,961,607 | A * | 6/1976 | Brems | 123/78 R |
| 3,970,056 | A * | 7/1976 | Morris | 123/48 D |
| 4,026,250 | A * | 5/1977 | Funiciello | 123/289 |
| 4,162,664 | A * | 7/1979 | Fleming | 123/288 |
| 4,205,638 | A * | 6/1980 | Vlacancinch | 123/46 A |
| 4,211,082 | A * | 7/1980 | Bristol | 60/605.1 |
| 4,211,190 | A * | 7/1980 | Indech | 123/48 B |
| 4,246,873 | A * | 1/1981 | Lih-Liaw | 123/48 AA |
| 4,286,552 | A * | 9/1981 | Tsutsumi | 123/48 AA |
| 4,307,999 | A * | 12/1981 | Vanderlaan | 417/324 |
| 4,313,403 | A * | 2/1982 | Bie, Jr. | 123/51 B |
| 4,319,546 | A * | 3/1982 | Beden | 123/19 |
| 4,321,904 | A * | 3/1982 | Bristol | 123/559.1 |
| 4,459,945 | A | 7/1984 | Chatfield | |
| 4,489,681 | A * | 12/1984 | Jackson | 123/52.3 |
| 4,491,095 | A * | 1/1985 | Coad | 123/46 R |
| 4,531,480 | A * | 7/1985 | Nam | 123/19 |
| 4,638,635 | A * | 1/1987 | Nam | 60/716 |
| 4,741,296 | A * | 5/1988 | Jackson | 123/58.9 |
| 4,834,029 | A * | 5/1989 | Wahnschaffe et al. | 123/41.42 |
| 4,974,554 | A * | 12/1990 | Emery | 123/48 B |
| 4,987,863 | A * | 1/1991 | Daly | 123/48 AA |
| 5,156,121 | A * | 10/1992 | Routery | 123/197.3 |
| 5,188,066 | A * | 2/1993 | Gustavsson | 123/48 A |
| 5,195,469 | A * | 3/1993 | Syed | 123/48 A |
| 5,245,962 | A * | 9/1993 | Routery | 123/197.3 |
| 5,341,771 | A * | 8/1994 | Riley | 123/48 AA |
| 5,404,851 | A * | 4/1995 | Neitz et al. | 123/321 |
| 5,551,233 | A * | 9/1996 | Tomoiu | 60/595 |
| 5,555,777 | A * | 9/1996 | Bell | 74/595 |
| 5,603,291 | A * | 2/1997 | Al-Kaheli | 123/47 R |
| 5,611,300 | A * | 3/1997 | Gray, Jr. | 123/48 A |
| 5,638,776 | A * | 6/1997 | Raynor | 123/45 A |
| 5,724,935 | A * | 3/1998 | Routery | 123/197.4 |
| 5,769,042 | A * | 6/1998 | Popadiuc | 123/78 B |
| 5,785,505 | A * | 7/1998 | Price | 417/364 |
| 5,816,201 | A * | 10/1998 | Garvin | 123/53.1 |
| 5,890,465 | A * | 4/1999 | Williams | 123/197.4 |
| 5,894,729 | A * | 4/1999 | Proeschel | 60/508 |
| 5,992,356 | A * | 11/1999 | Howell-Smith | 123/55.3 |
| 6,035,814 | A * | 3/2000 | Christenson et al. | 123/48 AA |
| 6,202,622 | B1 * | 3/2001 | Raquiza, Jr. | 123/197.4 |
| 6,484,674 | B2 * | 11/2002 | Valentin | 123/46 R |
| 6,526,935 | B2 * | 3/2003 | Shaw | 123/197.4 |
| 6,578,533 | B1 * | 6/2003 | Gray, Jr. | 123/78 D |
| 6,863,507 | B1 * | 3/2005 | Schaeffer et al. | 417/364 |
| 7,021,270 | B1 * | 4/2006 | Stanczyk | 123/197.3 |
| 7,076,950 | B2 * | 7/2006 | Klostermann | 60/513 |
| 7,121,236 | B2 * | 10/2006 | Scuderi et al. | 123/70 R |
| 7,210,430 | B2 * | 5/2007 | Jacobsen et al. | 123/46 R |
| 7,328,682 | B2 * | 2/2008 | Fisher | 123/197.4 |
| 7,552,707 | B2 * | 6/2009 | Fisher | 123/197.4 |
| 7,677,210 | B2 * | 3/2010 | Chasin et al. | 123/56.1 |
| 7,909,012 | B2 * | 3/2011 | Pattakos et al. | 123/197.4 |
| 8,215,280 | B2 | 7/2012 | Furr | |
| 2006/0185643 | A1 | 8/2006 | Lee et al. | |
| 2007/0084428 | A1 | 4/2007 | Weaver | |
| 2007/0089694 | A1 | 4/2007 | Hacsi | |

FOREIGN PATENT DOCUMENTS

| | | |
|---|---|---|
| DE | 3115417 A1 | 10/1982 |
| DE | 19527711 A1 | 2/1997 |
| EP | 0488431 A2 | 6/1992 |
| EP | 0603961 A1 | 9/1994 |
| GB | 152049 A | 10/1920 |
| JP | 58-102861 | 6/1983 |
| JP | 63-104640 | 5/1988 |
| JP | 6-98293 B2 | 4/1994 |
| JP | 6-98293 B2 | 12/1994 |
| JP | 2007-205159 A | 8/2007 |
| JP | 2008-505275 | 2/2008 |
| WO | WO 00/09871 A1 | 2/2000 |
| WO | WO 2006/004612 A2 | 1/2006 |
| WO | WO 2006/060859 | 6/2006 |
| WO | WO 2006/128332 | 12/2006 |
| WO | WO 2009/108954 A2 | 12/2009 |

OTHER PUBLICATIONS

Holubowicz, "Improving Mileage", Arno Hydrogen Technology Fair, Hanover, Germany, Apr. 24-28, 2006, pp. 1-8.

Holubowicz, "Improving Engine Ain't Rocket Science", Arno Hydrogen Technology Fair, Hanover, Germany, Apr. 24-28, 2006, pp. 1-10.

Kulman, "Gun Engine Explodes Fuel Efficiency", Pure Energy Systems News, May 2, 2006, pp. 1-5.

"Gun Engine", Pure Energy Systems Wiki, Oct. 2007, pp. 1-6.

* cited by examiner

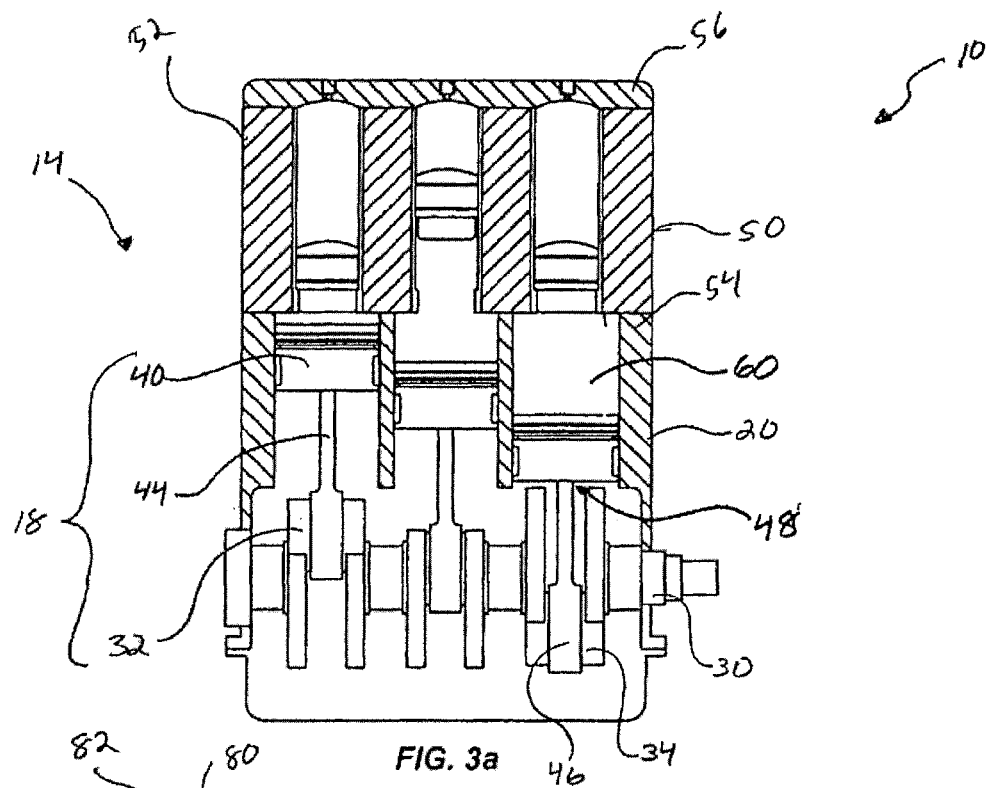
FIG. 3a
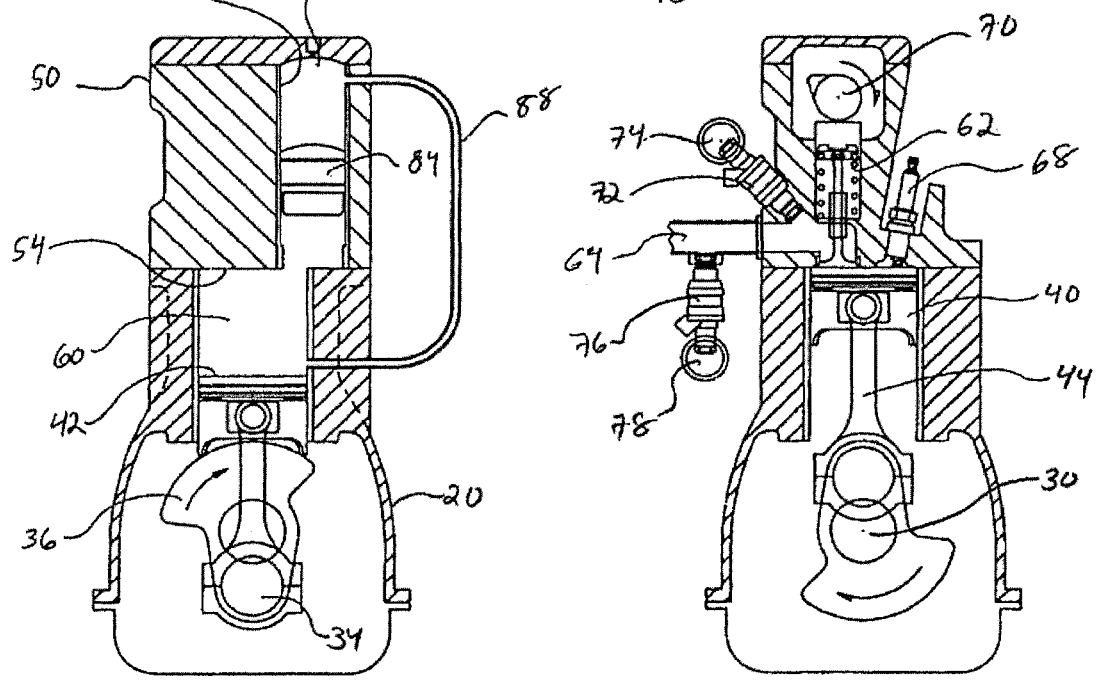
FIG. 3b
FIG. 3c

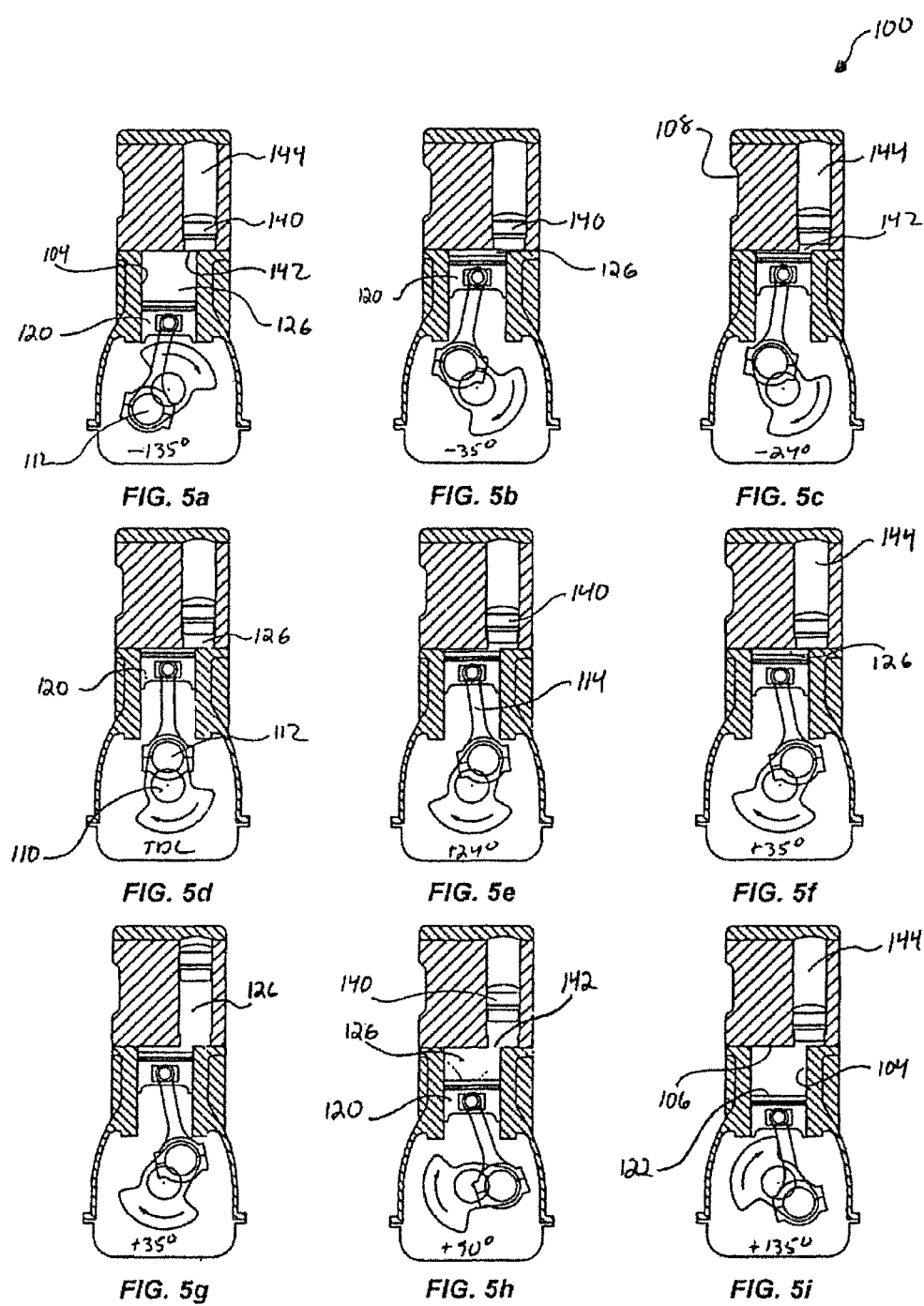

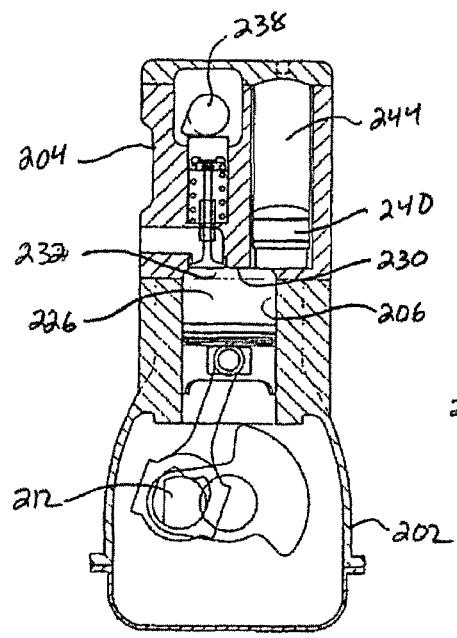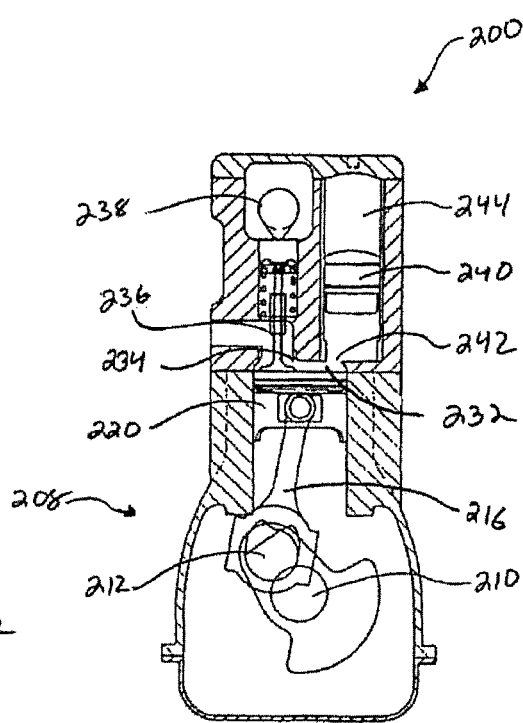
FIG. 14a  FIG. 14b
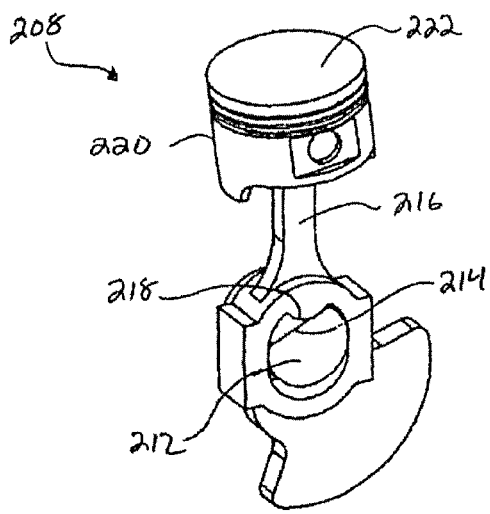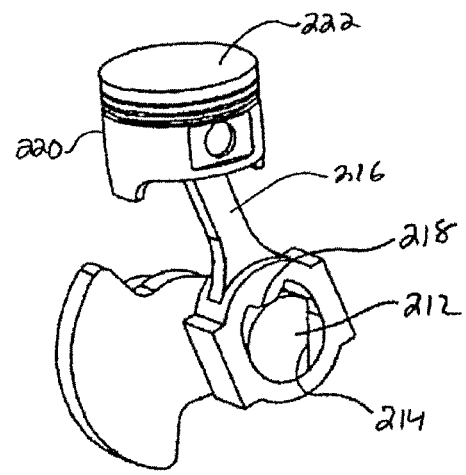
FIG. 15a  FIG. 15b

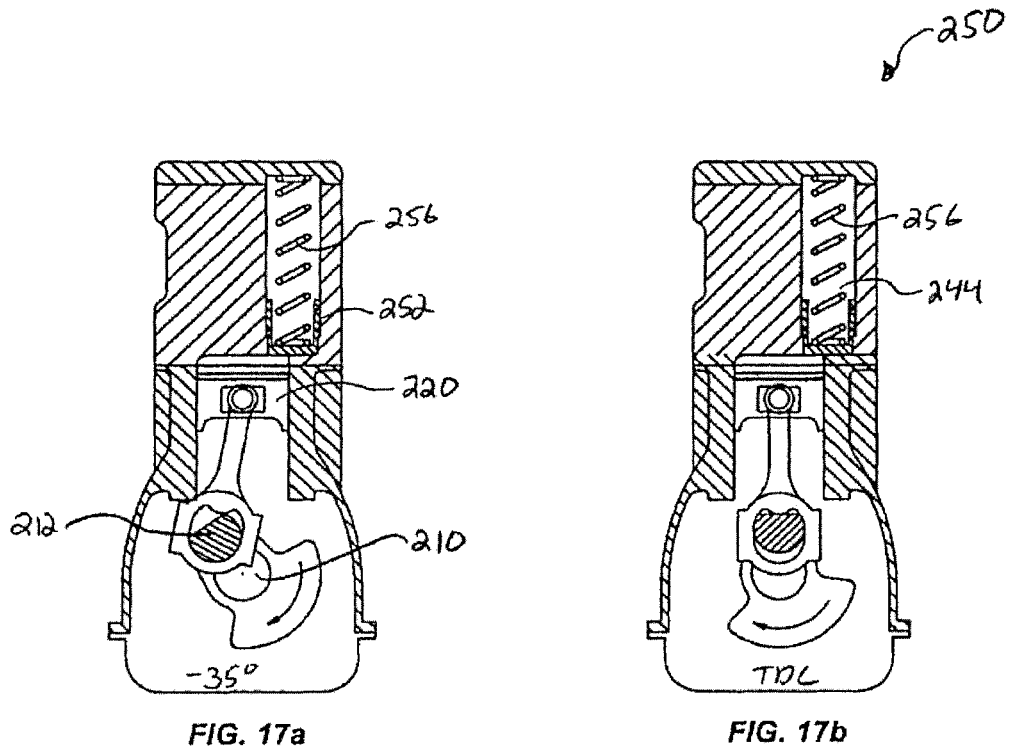
FIG. 17a
FIG. 17b
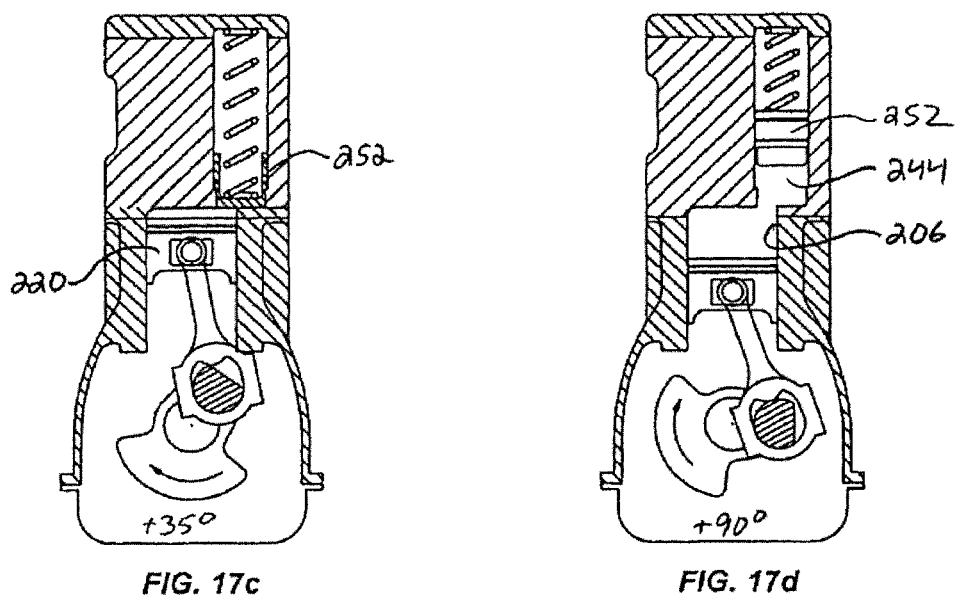
FIG. 17c
FIG. 17d

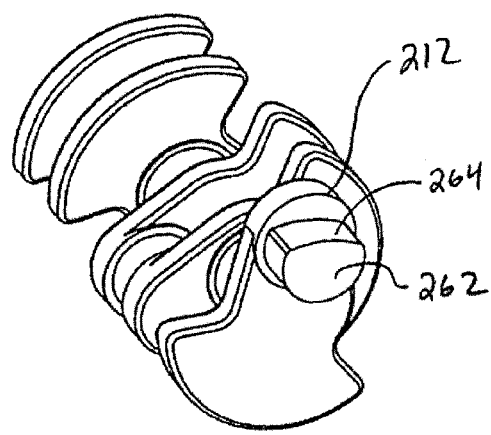
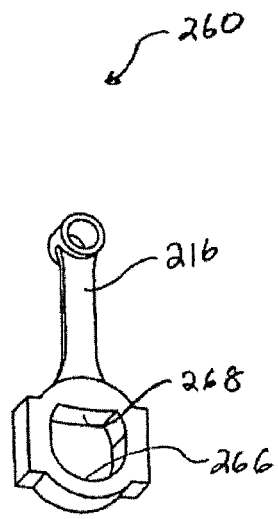
FIG. 18a  FIG. 18b
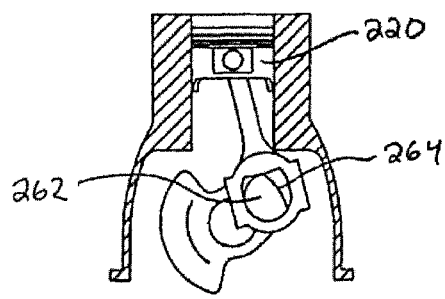
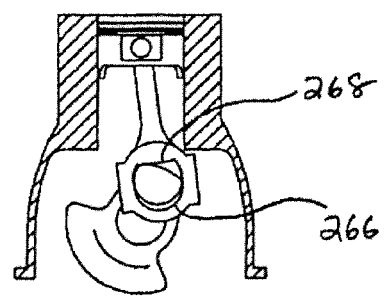
FIG. 18c  FIG. 18d
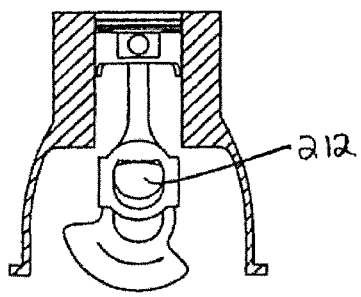
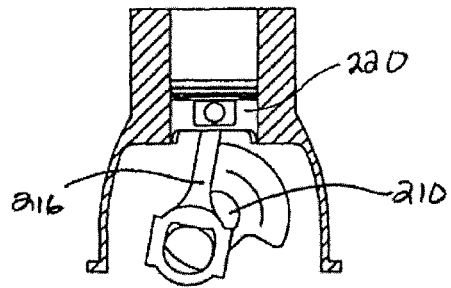
FIG. 18e  FIG. 18f

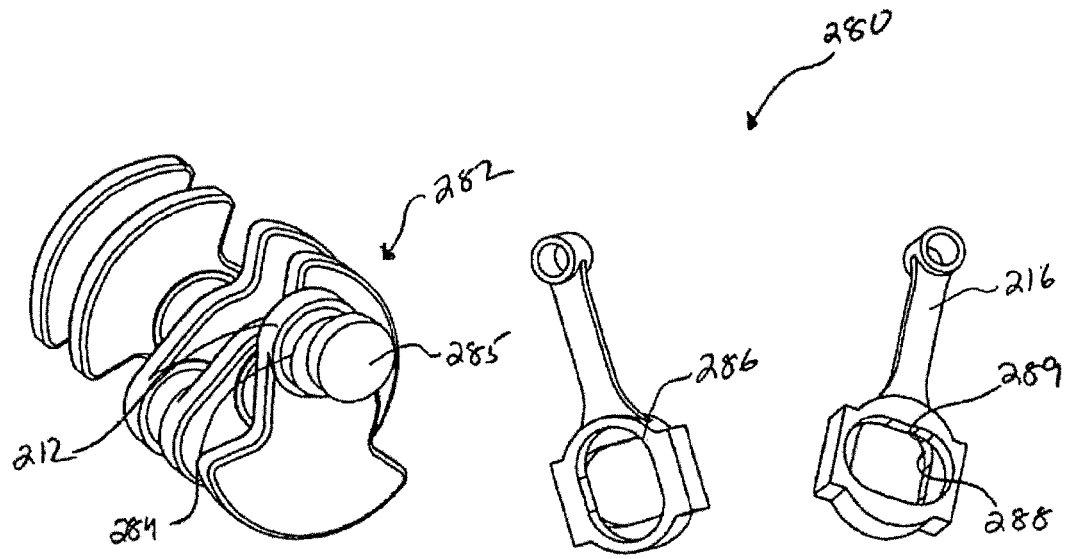
FIG. 20a    FIG. 20b
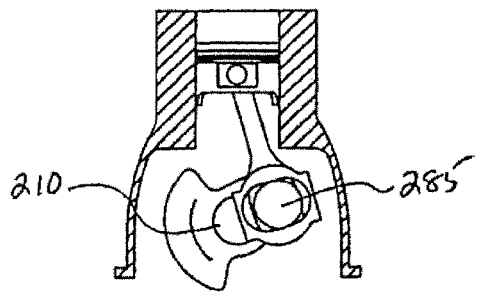
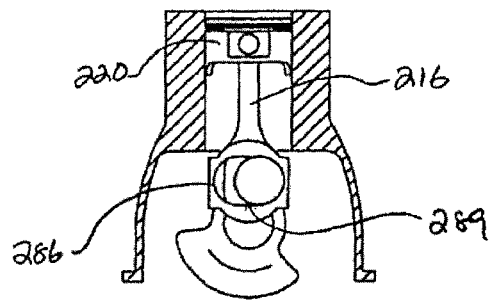
FIG. 20c    FIG. 20d
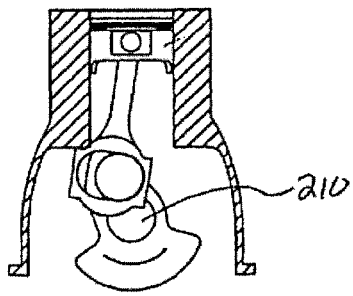
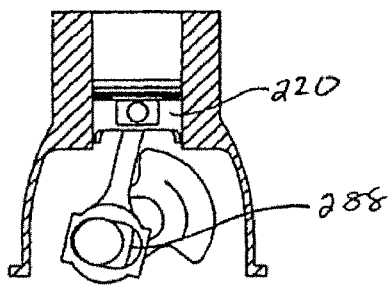
FIG. 20e    FIG. 20f

HIGH EFFICIENCY INTERNAL EXPLOSION ENGINE

RELATED APPLICATIONS

This application is a continuation of and claims priority to U.S. patent application Ser. No. 12/396,436, which was filed on Mar. 2, 2009, entitled "High Efficiency Internal Explosion Engine," and is scheduled to issue on Jul. 10, 2012 as U.S. Pat. No. 8,215,280, which claims priority to U.S. Provisional Application No. 61/067,638, filed Feb. 28, 2008, and entitled "High Efficiency Internal Explosion Engine," which are all expressly incorporated herein by reference in their entireties.

FIELD OF THE INVENTION

The field of the invention relates generally to reciprocating-piston engines, namely internal combustion engines, and more specifically to reciprocating-piston internal explosion engines.

BACKGROUND OF THE INVENTION AND RELATED ART

Most traditional internal combustion ("IC") engines suffer from an inherent dichotomy, in that the engines are configured for conventional ignition of the air/fuel mixture with the piston(s) and crankshaft at a top-dead-center ("TDC") position. Although this position results in the best condition for combustion, it is the worst condition for combustion in relation to the mechanics of the piston and crankshaft. In terms of the physics or the chemistry of hydrocarbon combustion, for example, firing at TDC seems to make the most sense since this is the rotary position of the crankshaft lever arm and the linear position of the piston where a highest compression of the air/fuel mixture can be realized. This seemingly optimum rotary position for the ignition and subsequent combustion of the volatile air/fuel mixture has been found to generate a calculated amount of energy for a given amount a fuel.

For many conventional IC engines, even though TDC is the best rotary position for combustion efficiency as compression ratios are at their peak, it is also the most inefficient rotary position mechanically because the crank and the connecting rod are momentarily aligned vertically at TDC so as to essentially "lock" the linkage where only a minimal amount of torque may be realized at that position. This condition continues until the crankshaft has had a chance to rotate past TDC to an angular position having a greater moment arm. Consequently, a significant portion of the potential (or available) energy generated at the time of combustion is unable to be applied as mechanical work, and is instead absorbed by the engine's cooling system or unnecessarily wasted and discharged as hot exhaust gases. As a result of the extreme energy and power losses through the unrecovered heat, application of the IC engine's current four-stroke function with ignition at or near TDC notoriously yields largely unusable torque except in narrow RPM band widths.

SUMMARY OF THE INVENTION

In light of the problems and deficiencies inherent in the prior art, the present invention seeks to overcome these by providing, for example, a piston-powered internal explosion ("IE") engine for providing power output through a rotating crankshaft. The IE engine includes an engine block having a plurality of power cylinders formed therein for receiving a plurality of working pistons, operable with respective crankshafts that are supported within bearing means and that each have an output end extending outside of the engine block operable with a respective plurality of offset power cranks. The IE engine further includes connecting rods operably coupled to the power cranks which are configured to transfer power from the working pistons to rotate the crankshaft, and working pistons received into the plurality of power cylinders and operably coupled to the power cranks. Each working piston has a head end positioned adjacent to a cylinder head to form a compression chamber, and is configured to receive power from an explosion of a compressed volume of air/fuel mixture located within the compression chamber and transfer the received power to the connecting rods. The IE engine is further configured so that the compressed volume of air/fuel mixture is substantially constant, and a peak compression ratio is maintained, from an angular position of the rotating crankshaft of at least 20 degrees prior to a TDC position of a compression stroke, to an angular position of at least 20 degrees after the TDC position of a power stroke, and prior to detonation or firing.

As embodied and broadly described herein, embodiments of the present invention also reside in a piston-powered internal explosion engine for providing power output through a rotating crankshaft. The IE engine includes an engine block having a plurality of power cylinders formed therein for receiving a plurality of working pistons, bearing means for supporting the crankshaft, and a crankshaft supported within the bearing means having an output end extending outside of the engine block and a plurality of offset power cranks. The IE engine can further include connecting rods operably coupled to the power cranks which are configured to transfer power from the working pistons to rotate the crankshaft, and working pistons received into the plurality of power cylinders and operably coupled to the power cranks. Each working piston has a head end positioned adjacent to a cylinder head to form a compression chamber, and is configured to receive power from an explosion of a compressed volume of air/fuel mixture located within the compression chamber and transfer the received power to the connecting rods. The IE engine can be further configured so that each power cylinder has a compression reservoir or chamber defined by a volume of dead space between the cylinder head and the head end of the working piston with the working piston at an uppermost position of linear travel, wherein the linear movement of the head end of the working piston is stayed for a period of time while at the uppermost position of linear travel and throughout a plurality of angular positions of the crankshaft. In other words, the IE engine can be configured such that the working piston is caused to be held in an uppermost position (a position resulting in peak compression) as the crankshaft rotates through a plurality of pre-defined angular positions. To be sure, the motion of the crankshaft is not stayed and continuously rotates through its various intended cycles or revolutions.

Additionally, and as embodied and broadly described herein, embodiments of the present invention also reside in a piston-powered internal explosion engine for providing power output through a rotating crankshaft, wherein the IE engine includes an engine block having bearing means for supporting the crankshaft, and power cylinders for receiving working pistons to form working cylinder/working units with compression chambers between the head end of the working piston and a cylinder head of the power cylinder. The IE engine can further include a crankshaft supported within the bearing means having an output end extending outside of the engine block and a plurality of offset power cranks, connecting rods operably coupled to the power cranks which are configured to transfer power from the working pistons to rotate the crankshaft, and working pistons received into the plurality of power cylinders and operably coupled to the power cranks. The working pistons are configured to receive power from an explosion of a compressed volume of air/fuel mixture located within the compression chamber and transfer the received power to the connecting rods.

The IE engine can be further configured so that each working cylinder/piston unit includes a floating piston cylinder operable with the cylinder head. The floating piston cylinder can have an open end and a closed end, with the open end being in fluid communication with the compression chamber and having a sealing surface associated therewith. A floating piston can be located within the floating piston cylinder and configured to travel between the open end and the closed end in response to a pressure within the compression chamber, as well as to dynamically separate the floating piston cylinder from the combustion chamber. A biasing device can be configured to bias the floating piston towards a closed position against the sealing surface. The IE engine can be further configured with a volume of dead space between the head end of the working piston and the cylinder head that is less than a volume of the floating piston cylinder, so that a rising pressure inside the compression chamber caused by the upward displacement of the working piston overcomes the bias and forces or causes a majority portion of the compressed volume of air/fuel mixture to dynamically shift and to be received into the floating piston cylinder. A resultant falling pressure inside the compression chamber allows this majority portion of the compressed volume of air/fuel mixture back into the compression chamber. Advantageously, as this dynamic shift occurs, namely as the volume of compressed air/fuel moves into and out of the floating piston cylinder, the compression volume and a peak compression ratio is maintained substantially constant prior to detonation or firing. In addition, enhanced mixing of the air/fuel mixture occurs as it is caused to displace in the manner discussed.

BRIEF DESCRIPTION OF THE DRAWINGS

Features and advantages of the invention will be apparent from the detailed description that follows, and which taken in conjunction with the accompanying drawings, together illustrate features of the present invention. It is understood that these drawings merely depict representative embodiments of the invention and are not, therefore, to be considered limiting of its scope. It will be readily appreciated, furthermore, that the components of the present invention, as generally described and illustrated in the figures herein, could be arranged and designed in a wide variety of different configurations. Nonetheless, the invention will be described and explained with additional specificity and detail through the use of the accompanying drawings, in which:

FIGS. 3a-3c together illustrate front and side cross-sectional views of the assembled engine block, in accordance with the embodiment of FIG. 1;

FIGS. 5a-5i together illustrate a series of sectional views of the sequencing of the compression and power strokes of the IE engine, in accordance with another representative embodiment of the present invention;

FIGS. 14a-14b together illustrate a series of sectional views of an assembled IE engine block with "CRAM" linkage, in accordance with another representative embodiment of the present invention;

FIGS. 15a-15b together illustrate perspective views of a representative CRAM linkage, in accordance with the embodiment of FIG. 14;

FIGS. 17a-17d together illustrate a series of sectional views of the sequencing of the compression and power strokes of the IE engine, in accordance with another representative embodiment of the present invention;

FIGS. 18a-18f together illustrate perspective views of another representative CRAM linkage, and sectional views of the same during sequencing through the compression and power strokes of the IE engine, in accordance with an embodiment of the present invention;

FIGS. 20a-20f together illustrate perspective views of another representative CRAM linkage, and sectional views of the same during sequencing through the compression and power strokes of the IE engine, in accordance with an embodiment of the present invention;

DETAILED DESCRIPTION OF EXEMPLARY EMBODIMENTS

Figure 1:
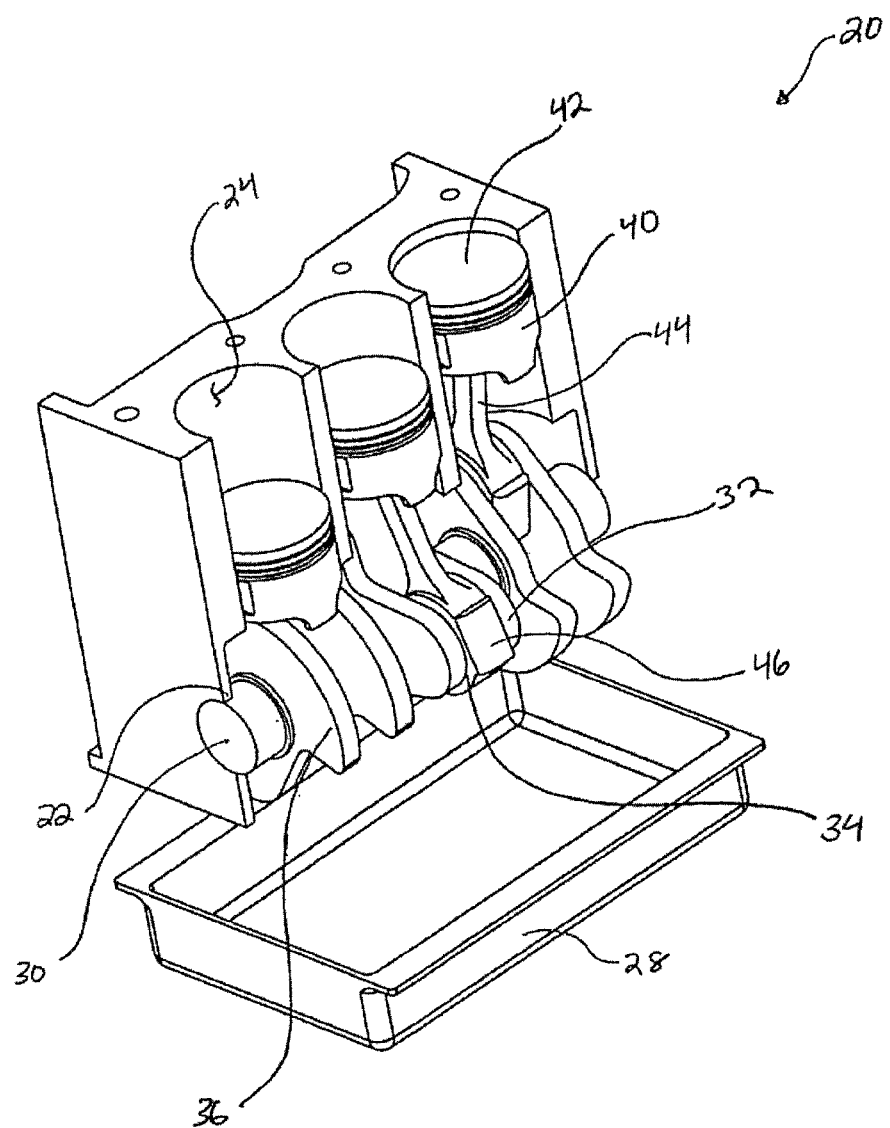
FIG. 1 illustrates an exploded, perspective view of a lower engine block of an internal explosion ("IE") engine, in accordance with a representative embodiment of the present invention.

The following detailed description of the invention makes reference to the accompanying drawings, which form a part thereof and in which are shown, by way of illustration, exemplary embodiments in which the invention can be practiced. While these representative embodiments are described in sufficient detail to enable those skilled in the art to practice the invention, it should be understood that other embodiments may be realized and that various changes to the invention can be made without departing from the spirit and scope of the present invention. As such, the following more detailed description of the representative embodiments of the present invention is not intended to limit the scope of the invention as it is claimed, but is presented for purposes of illustration only, to describe the features and characteristics of the present invention, and to sufficiently enable one skilled in the art to practice the invention. Accordingly, the scope of the present invention is to be defined solely by the appended claims.

In a representative embodiment, the present invention describes a system and method for delaying the initiation of a combustive-type reaction and the subsequent application of the reaction products to the working piston of an internal explosion ("IE") engine until the engine crank has rotated to a more mechanically advantageous position, for example, one that encourages and facilitates an explosive-type reaction. The internal explosion-type reaction can generate more torque and performs more work per BTU of fuel than a traditional internal combustion ("IC") engine that initiates combustion at top-dead-center (TDC), thereby both increasing the power output and efficiency of the engine.

In another representative embodiment, the present invention includes a system and method for maintaining a compressed air/fuel mixture of a reciprocating-piston engine at a constant volume compression ratio, such as at a peak compression ratio, through a range of crank positions, and delaying detonation of the compressed air/fuel mixture until the working piston has passed through the top dead center position and the engine crank has rotated to a more mechanically advantageous position that allows the resulting explosive reaction products to perform more work and generate more torque as compared with conventional IC engines that combust at TDC. In one aspect, the system and method for maintaining the compressed volume of air/fuel mixture at a constant volume and desired compression ratio can include a floating piston cylinder and a floating piston. In another aspect the system and method can include a "CRAM" linkage with a hemispherical or "hemi" power cylinder head. In still another aspect, these systems can be combined together, each as described in greater detail below.

In another representative embodiment, the present invention includes a system and method for temporarily accumulating the reaction products produced by the detonation into a floating piston cylinder, and subsequently releasing the reaction products back into the power cylinder while the crank rotates through a range of mechanically advantageous positions, both to reduce the peak pressure and temperature of the explosive reaction and to further increase the work and torque generated during the power stroke. In one aspect the system and method for accumulating the reaction products can include a floating piston moveable within the floating piston cylinder and biased by an opposing gas charge. In another aspect the system and method can include a floating piston moveable within the floating piston cylinder and biased by a mechanical spring.

In another representative embodiment, the present invention includes a system and method for injecting water microdroplets with the air/fuel mixture prior to detonation, to further increase the peak pressure and reduce the peak temperature of the reaction products in order to further increase the work and torque generated during the power stroke.

In another representative embodiment, the present invention further includes a system and method for modifying the profile of the various valve cams pressing against the valve lifters to actuate the intake and exhaust valves, and which can act to extend the time or angular window in which a valve is open, to modify the speed and time in which a valve opens or closes, and to allow more than one valve to be open at one time.

Each embodiment of the present invention internal explosion engine can provide significant advantages over prior related reciprocating-piston IC engines, some of which are recited here and throughout the following more detailed description. For instance, delaying detonation of the compressed air/fuel mixture until the working piston has passed through the top dead center position and the engine crank has rotated to a more mechanically advantageous position (such as 35 degrees past TDC) can reduce the resistance of the power linkage (e.g. the working piston, connecting rod and power crank) to the point that the standard combustion-type reaction of the air/fuel mixture can be transformed into an explosive-type reaction. This rapidly-expanding and more complete type of reaction can generate greater power (e.g. pressure) at a lower temperature and with less waste products per BTU of fuel than conventional IC engines and their commonplace combustion-type reactions. The mechanically advantageous positions provided by the explosion engine of the present invention further allows the resulting reaction products to perform more work and generate more torque per BTU of fuel than a standard IC engine.

The term "combustion", as used herein, can refer to the conventional process of mixing oxygen with small liquid hydrocarbon droplets or with hydrocarbon vapor, followed by ignition in a physical environment where expansion is not immediately possible.

The term "explosion", as used herein, can refer to the mixing of oxygen with small liquid hydrocarbon droplets or with hydrocarbon vapor (and water droplets or vapor), and detonating the mixture in a physical environment where expansion is facilitated and made possible.

The terms "internal explosion engine" or "IE engine", as used generally herein, can refer to a reciprocating-piston engine configured for detonation with the piston sufficiently past the TDC position to allow for the rapid-expansion of the product gases against an easily-moveable working piston, resulting in an explosive-type rapid-expansion reaction that produces greater pressure at a lower temperature. In the absence of a TDC mechanical lock and a more favorable moment angle of the power linkage, the relatively low resistance of the piston head creates an opportunity for a more-or-less immediate expansion from within the combustion chamber.

The principles behind the transformation from an IC reaction to an IE reaction can be described as follows. During the downward intake stroke of four-stroke reciprocating-piston IC engines, fuel and air are supplied through the intake manifold and mixed together by means of a carburetion or fuel injection system and drawn by vacuum into the cylinder as the intake valve opens. At the conclusion of the intake stoke and the beginning of the compression stroke, the working piston is positioned at bottom-dead-center (hereinafter "BDC") in the cylinder. During the subsequent, upwardly-directed compression stroke the air/fuel mixture is compressed by a reduction in volume between the upper surface of the working piston and the enclosed head of the power cylinder. The head of the power cylinder provides a small physical or volumetric area, known as the "combustion chamber", and in gasoline engines this chamber is usually about 1/10th the displacement volume of the cylinder when the working piston is at BDC. As the crankshaft rotates 180 degrees along its sinusoidal path, the working piston traverses along its linear path toward TDC, where the air/fuel mixture reaches its full compression, such as approx. 10 atmospheres or 10 times the volume of its original ambient pressure, a term known in the industry as the "compression ratio." Compression ratios for high performance gasoline engines and diesel engines can be higher, while air/fuel mixtures at ratios of less than 7:1 may not combust when ignited, or if combustion does occur, the resulting expansion pressures may be ineffective when applied to the piston.

In most standard IC engines ignition takes place at the moment when the working piston is at TDC and the air/fuel mixture is fully compressed, in order to insure the most efficient "burn" of the mixture. As stated above, however, even though the minimum combustion chamber volume found at TDC is most favorable for chemical ignition, the angular positioning of the piston and crank at TDC results in the worst possible mechanical alignment for the extraction of work. This is because the pivotal joints in the power linkage are all vertically aligned, which creates a natural high resistance or effective "lock" where no movement can be realized regardless of the intensity of the combustion pressures without failure to the components of the power linkage. As can be appreciated by one of ordinary skill in the art, useable work within the engine cannot be generated without movement of the power linkage, and one must therefore wait for the crank to rotate to a more favorable "moment angle" before the combustion energy can be extracted.

The process of generating work in a standard IC engine can be further impacted because the time required for the crank to move along its sinusoidal path through to a more favorable "moment angle" is far greater than the time duration of the effective pressure spike created during the combustion of the air/fuel mixture. An estimated 70% to 75% of the potential energy originally available for work can be lost waiting for the crank to rotate to more favorable moment angles, especially at slower rotational crank speeds, such as is common during engine idling. As such, standard or conventional IC engines are less efficient as they are unable to convert much of the potential or available energy in the combustion into useable work energy. Instead, available work energy is lost to heat and waste which causes the IC engine to operate at higher temperatures and to produce less output power or torque than if a higher, more efficient percentage of energy were converted to work. More specifically, unable to expand into work, the energy is instead converted to excess heat and dissipated through the engine's cooling system or discharged in the form of high temperature exhaust gases. Additionally, the incomplete combustion and excess heat can both oxidize the nitrogen in the mixture to produce nitrous oxide, and can lead to the undesirable production of excess carbon monoxide as a result of the hydrocarbon chemicals being held in a "closed" chamber where temperatures are held in excess of 1,200 degrees Fahrenheit for several milliseconds.

Additionally, the mechanical and thermal stresses imparted upon the engine's power linkage at TDC and the mechanical lock occurring thereat can be very high, and over a period of time can result in premature wear, failed bearings, bent connecting rods and broken working pistons, etc.

It will be appreciated by one of skill in the art that hydrocarbon fuels will combine with oxygen and explode or produce more of an explosion-type reaction, rather than combust, when immediate mechanical expansion is possible at the moment of ignition. Significantly greater pressures, as compared to the confining physical conditions of combustion, can be generated upon the detonation or ignition of the gaseous hydrocarbons or atomized liquid hydrocarbons, with the fuels being more likely to be totally self-consumed during the rapidly expanding explosive reaction. It will also be appreciated that explosion-type chemical reactions transpire over a much shorter period of time than combustion type-reactions. For example, explosive mixtures of oxygen and vaporized hydrocarbons that are allowed to expand freely upon detonation can realize pressure and temperature spikes measured in micro-seconds, or in some cases, nanoseconds. In contrast, the ignition of carbureted hydrocarbon droplets can have a "burn duration" measured in milliseconds, which can be hundreds to thousands of times slower. This comparison can be referred to as "vapor explosion" vs. "droplet combustion."

The components of standard IC engines can be more susceptible to damage from faster-burning or explosion-type reactions because of the temporarily and effectively "locked" alignment of the pivotal joints in the power linkage at TDC. As a result, combustion schemes have been developed by skilled artisans in the engine manufacturing industry to facilitate slower burning air/fuel mixtures to reduce stress levels in the engine and increase the long-term reliability of the mechanical components. This is normally accomplished in standard IC engines by carbureting or spraying the liquid hydrocarbon fuel into droplets that are many thousands of times larger than the completely-evaporated hydrocarbon vapor molecules.

In contrast to the standard IC engine, the IE engine of the present invention both maintains a constant compressed volume/desired (e.g., peak) compression ratio through a given range of crank positions following a TDC position of the primary piston, and delays detonation or ignition of the compressed air/fuel mixture until the working piston has passed the top TDC position and the engine crank and connecting rod have moved to a more mechanically advantageous position. The improved alignment of the power linkage allows the engine to immediately respond to and convert the explosive reaction energy to work, thereby reducing the stresses imparted to the mechanical components even though the initial peak pressures and temperatures produced in the explosive-type reaction can be substantially higher than would exist in a combustion-type reaction.

Thus, it can be appreciated that the present invention can first transform an internal reaction from a (relatively) slow-burning combustion to a rapidly-expanding, quick-burn explosion by allowing for the immediate expansion of the combustion chamber from a high or even peak compression of the air/fuel mixture as maintained over a plurality of crank positions. Secondly, the improved alignment of the power linkage of the IE engine at the moment of detonation can immediately and advantageously convert the increased reaction energy into useful mechanical work to produce greater power (e.g. pressure) at a lower temperature, and with reduced stress levels on the mechanical components.

Another advantage of some embodiments of the present invention is the temporary accumulation of the reaction products into a floating piston cylinder upon detonation of the air/fuel mixture in the compression chamber. This accumulation of reaction gases from the compression chamber into the floating piston cylinder can have multiple benefits, including the temporary storage and delayed release of the reaction energy to the working piston, an increased ability to accommodate the higher pressures generated during a rapidly expanding, explosion-type reaction of the compressed air/fuel mixture, and a reduction in the peak pressure and temperature of the reaction as a result of the additional expansion. As can be appreciated by one skill in the art, such accumulation, when applied simultaneously with the delayed detonation/constant (e.g., peak or desired) compression ratio/constant volume of air/fuel mixture scenario described above, the increased pressure applied to a longer moment arm can further provide more torque and power output from the IE engine.

Each of the above-recited advantages will be apparent in light of the detailed description set forth below and best understood with reference to the accompanying drawings, wherein the elements and features of the invention are designated by numerals throughout. These advantages are not meant to be limiting in any way. Indeed, one skilled in the art will appreciate that other advantages may be realized, other than those specifically recited herein, upon practicing the present invention.

With reference to FIGS. 1, 2 and 3a-3c, illustrated is a high-efficiency internal explosion ("IE") engine 10 in accordance with one representative embodiment of the present invention. A partially-exploded, perspective view of the engine block 20 of the IE engine is shown in FIG. 1, while a partially-exploded, perspective view of an engine head 50 is provided in FIG. 2. As shown in FIGS. 3a-3c, when gathered together with the principle power components, namely the crankshaft 30, connecting rods 44 and working pistons 40, and provided with the host of auxiliary engine components, the engine block 20 and engine head 50 can be assembled together to form a representative three-cylinder, four-cycle internal explosion engine 10. Although useful for illustrative and testing purposes, it is to be understood that the three cylinder, four-cycle IE engine configuration illustrated in FIGS. 1, 2 and 3a-3c is not considered limiting in any way, and that IE engines of the present invention can be successfully employed with reciprocating piston engines having any number of cylinders, as well comprising either two-cycle or four-cycle variations.

Referring now to FIG. 1, the engine block 20 primarily serves as a structure with bearing surfaces 22 for receiving a crankshaft 30, and one or more precision cylindrical compartments 24 for receiving one or more working pistons 40 coupled to the crankshaft with connecting rods 44. As depicted, the representative IE engine 10 can include a crankshaft 30 with multiple throws or power cranks 32, each crank having a journal surface 34 that couples with a rod bearing 46 formed in the lower end of the connecting rods 44. Wrist pins 48 can be formed into the upper ends of the connecting rods to further attach the working pistons 40 and connecting rods together, with the top face or surface 42 of the working piston forming the lower boundary of the compression chambers 60. The crankshaft 30 can further include a number of counterweights 36 that are formed with or attached separately to the crankshaft 30 in locations opposite the power cranks 32, to balance the weights of the offset cranks, the reciprocating connecting rods 44 and the working pistons 40. A common oil pan cover 28 can be attached to the bottom of the engine lower block 20 with a fluid-tight oil seal to contain the necessary lubricating fluids within the engine block.

The top surfaces 42 of the working pistons 40, the power cylinder compartments 24 and the cylinder heads 54 (see FIG. 3a) can serve to define the bottom, side, and top surfaces, respectively, of the compression chambers 60 in which the explosion reactions take place. Furthermore, the working pistons 40, connecting rods 44 and offset power cranks 32 can together form the power linkages 18 for each engine throw or cylinder that functions to transfer energy and power from the explosion reactions to the rotating crankshaft 30. Those skilled in the art will appreciate that one or more of the power cranks 32, connecting rods 44, working pistons 40 and cylindrical compartments 24 can be modified or altered in accordance with particular embodiments of the IE engine, as described in more detail below.

Figure 2:
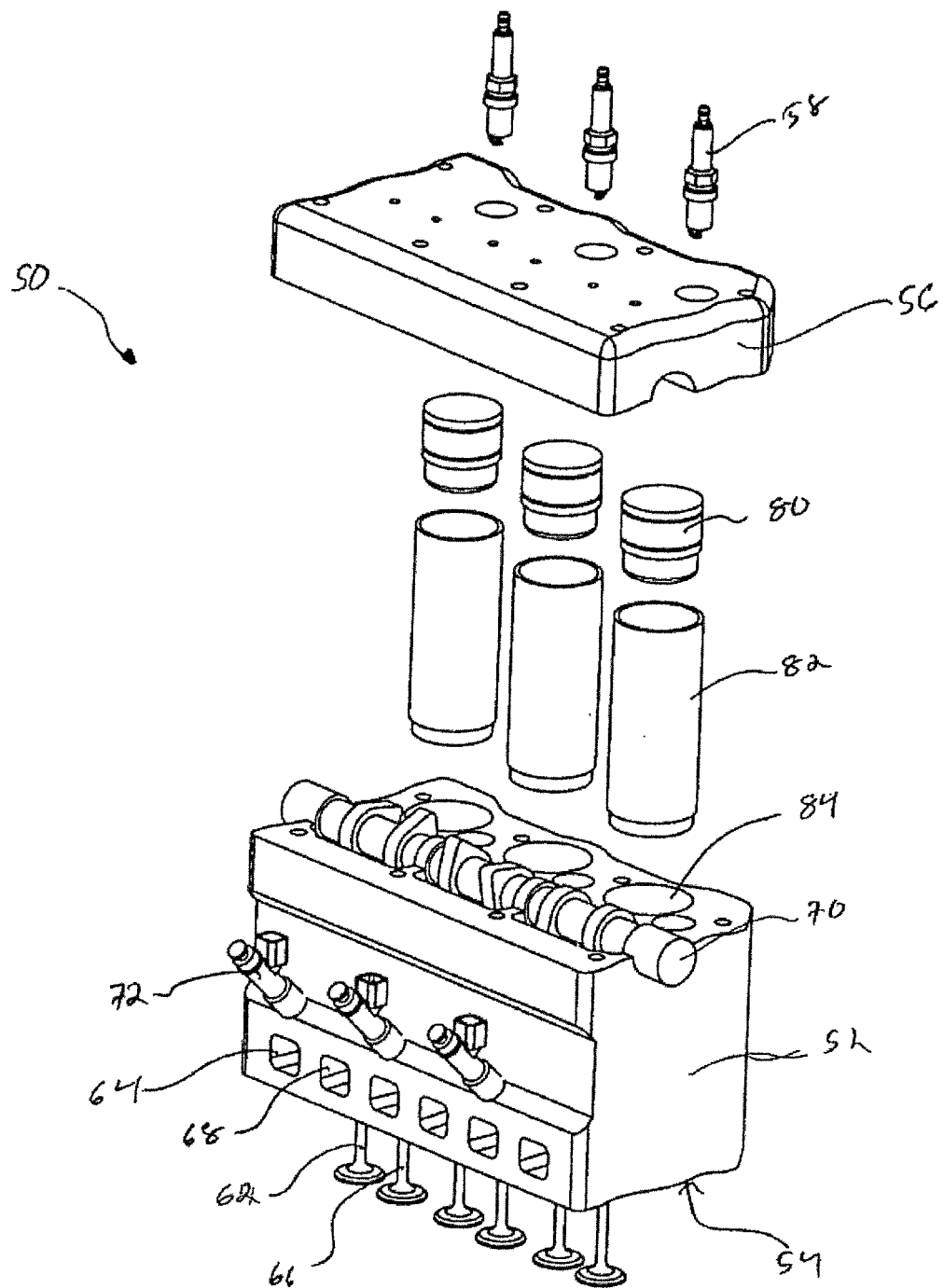
FIG. 2 illustrates an exploded, perspective view of an upper engine block, in accordance with the embodiment of FIG. 1.

While the engine block 20 primarily serves as a casing for supporting the power components, the engine head 50 illustrated in FIG. 2 can serve as a structure for the support and containment of the several auxiliary engine workings. These components can include intake ports 64 and intake valves 62, exhaust ports 68 and exhaust valves 66, fuel injectors 72, a freely-rotating camshaft 70, a head cover 56 attached to the top of the head body 52, and spark plugs 58. Other auxiliary components of the IE engine (see FIG. 4e) include a sprocket pulley or gear pulley 92 attached to the crankshaft 30, a sprocket pulley or gear pulley 94 attached to the camshaft 70, and a chain or gear belt 96 meshing freely with both the crankshaft and camshaft sprocket or gear pulleys to drive the cam shaft and valve cylinders at a correct timing ratio, for example 2:1 for the four-cycle IE engine 10 illustrated.

The engine head 50 can also incorporate additional components that are unique to the present invention. As illustrated in FIGS. 2 and 3a-3c, these components can include a floating piston cylindrical compartment 84 within the head placed in such a manner as to generate a ported or common intersection to the working piston cylindrical compartment 24 provided in the engine block 20; a non-actuated piston 80 (hereinafter "floating piston") installed within the cylindrical compartment 84 in the head and capable of traversing freely; a hardpipe 88 providing a connection between the working piston cylindrical compartment 24 in the block and the floating piston cylindrical compartment 84 in the head; a fuel injector 72 mounted in the side wall of the head and adjacent to and in the proximity of the intake valve 62; a fuel injector used as a water injector 76 mounted in the intake manifold 64; a cast iron liner 82 installed in the head body 52 for each floating piston 80; a fuel rail 74 (shown in cross section) for supplying liquid fuel to the fuel injector; and a water rail 78 for supplying water to the water injector.

Other various components and parts are contemplated that contribute to the overall function of the IE engine, such as journals, bearings, pins, liners, sleeves, guides, rings, seals, seats, gaskets, fasteners, and carburetion components and other assemblies, etc. Some of these components may be shown in the figures, but are not indicated for ease of illustration and discussion.

Figure 4A:
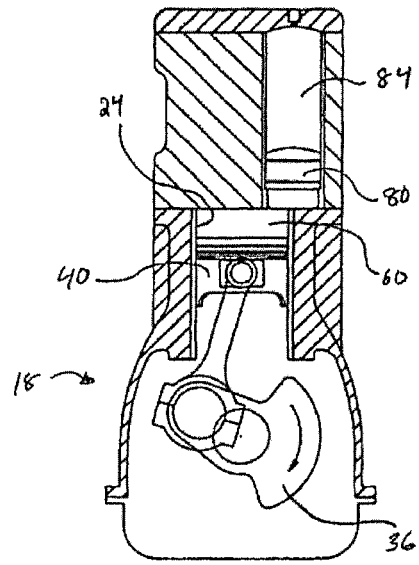
FIGS. 4a-4e together illustrate a series of sectional views of the sequencing of the four strokes of the IE engine, in accordance with the embodiment of FIG. 1.

FIGS. 4a-4d are generalized representations of the active components of the representative IE engine during each of the four strokes of the four-cycle explosion engine. FIG. 4a, for instance, depicts the counterweight 36 of power linkage 18 rotating downward while the piston 40 moves linearly upward within the power cylinder compartment 24 during the compression stroke. A mixture of fuel and air (and possibly water) is being rapidly compressed within the decreasing volume of the compression chamber 60, which can be bounded at the top by the fixed head surface 54 of the engine head 50, and the floating piston 80 located at the bottom of the floating piston cylinder 84. A pre-determined charge of pressurized gas, such as an exhaust gas, can fill the volume of the floating piston cylinder 84 above the floating piston 80, and can be sufficiently and selectively pressurized to apply a counteracting force that keeps the floating piston from moving in response to the rising pressure in the compression chamber 60 below, until a certain threshold pressure resulting in a desired compression ratio is reached, as described below.

Figure 4B:
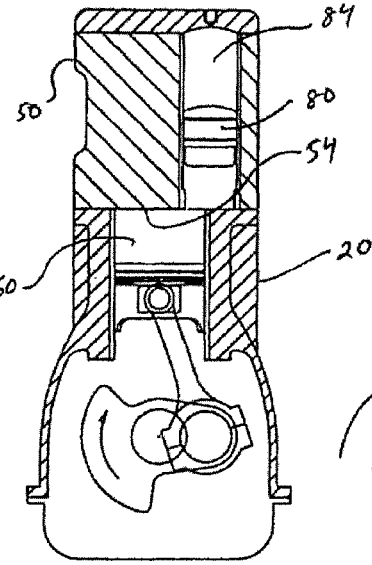
Figure 4E:
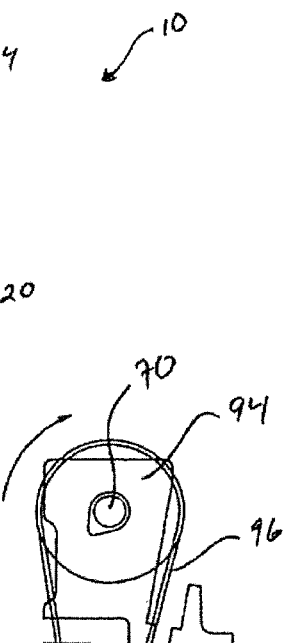

The power stroke is illustrated in FIG. 4b, with the piston being pushed downwards in response to an explosive ignition of fuel and air inside the compression chamber 60. The pressure generated in the explosion can be sufficient to overcome the charge of pressurized gas filling the volume above the floating piston 80, so that the floating piston can displace upwards into floating piston cylinder 84 and compress the charge gas until an equilibrium state is reached between the pressures acting above and below or rather on opposing sides of the floating piston, after which the floating piston can travel downwards in more or less synchronized fashion with the working piston.

Figures 4C, 4D:
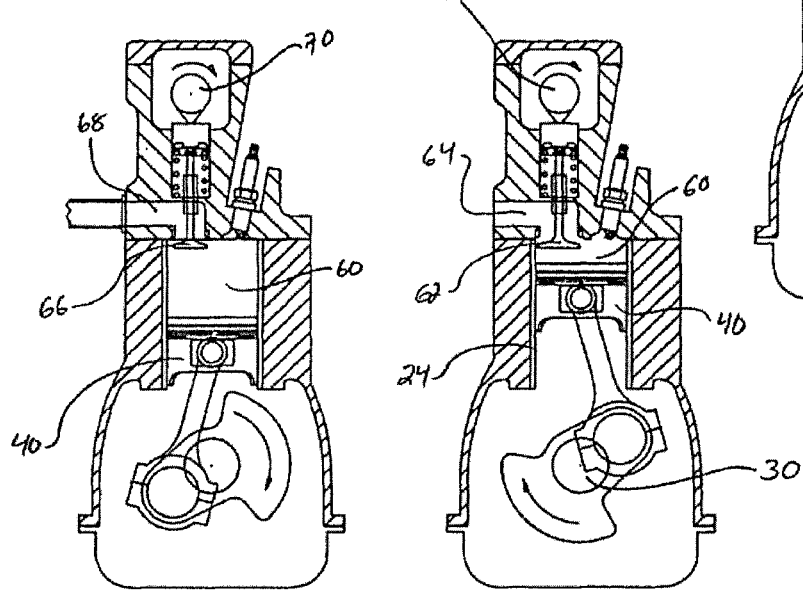

FIG. 4c captures the active components of the IE engine during the exhaust stroke, in which a lobe of the cam shaft 70 has rotated downwards to push open the exhaust valve 66 while the working piston travels upwards to force the exhaust gases out of the exhaust port/manifold 68. In FIG. 4d, the cam shaft 70 can continue to rotate in timing with the crankshaft 30 to release the exhaust valve and open the inlet valve 62, so that a fresh charge of fuel and air (and possibly water) can flow through the inlet manifold/port 664 as the working piston 40 moves downward within power cylinder compartment 24 to draw the gases and suspended droplets of liquid fuel/water into the compression chamber 60.

FIGS. 5a-5i together illustrate a series of sequenced, sectional views detailing the progression of the compression and power strokes of the representative IE engine described above. More specifically, FIGS. 5a-5i describe one representative embodiment 100 of the present invention for maintaining the compressed air/fuel mixture of a reciprocating-piston engine at a constant volume and at a desired (e.g., peak or something less than peak) and selective compression ratio through a range or plurality of crank 112 positions, and delaying detonation or ignition of the compressed air/fuel mixture until the working piston 120 has passed through the top dead center position and the engine crank has rotated to a more mechanically advantageous position that allows the resulting explosive reaction products to perform more work and generate additional torque, as compared with prior related IC engines, due to the rapid expansion of the combustion chamber.

The embodiment 100 of the IE engine can operate to maintain the compressed air/fuel mixture at a constant volume and at a desired and selective compression ratio through a range of crank positions by means of a "switching" process. This is accomplished by configuring the IE engine with a floating piston 140 and a floating piston cylinder 144 that is in fluid communication with the working piston cylindrical compartment 104, as described above, as well as eliminating or substantially reducing the dead space volume of the combustion chambers formed into the bottom surface of the engine head 108. As compared with conventional IC engines, this may also require re-positioning of the throw 112 of the crankshaft 110 and adjustments to the connecting rod 114.

As can be appreciated by one skilled in the workings of a standard IC engine, at TDC the working piston stops short of contacting the bottom surface of the engine head, leaving a dead space volume (e.g. the combustion volume) that can be approximately 1/10 the volume of the compression chamber 126. With this dead space volume eliminated or substantially reduced in the IE engine 100 of the present invention, when the crank 112 reaches a rotational position prior to TDC (e.g., 35 degrees prior) the compressed volume above the top surface 122 of the working piston is caused to be approximately the same as it would have been at TDC if the combustion volume were still present in the engine head 108. As the working piston 120 continues to move toward TDC in its cylinder 104 and the volume of the compression chamber 126 is continuously pressurized, the compressed air/fuel mixture is forced to move through a common port or aperture 142 between the working piston cylinder 104 and the floating piston cylinder 144, and is accumulated or temporarily stored in the floating piston cylinder as the floating piston 140 retracts upwards and away from the compression chamber 126.

Thus, when the working piston 120 reaches TDC, nearly all or at least a majority part of the compressed air/fuel mixture is received into or shifted to the floating piston cylinder 144 with little or no change in compression ratio or pressure (e.g., the compression ratio at the time shifting occurs is maintained), and with substantially no change in volume from the time the floating piston initially began to displace. This transfer or shift is made possible by porting the air/fuel mixture to the floating piston cylinder 144 with the floating piston strategically pre-pressurized or biased so that this shift is caused to begin to occur at a pre-determined rotational position of the crank and linear position of the working piston.

As the crankshaft 110 continues to rotate, and the connecting rod 114 moves further along its sinusoidal path, the working piston 120 begins to move away from TDC and back down the cylinder 104, until the crankshaft reaches a pre-determined point past TDC (e.g., 35 degrees past TDC), whereupon the air/fuel mixture is returned to the working piston's cylinder and detonation can be initiated. It is noted that during this shifting phase, the combustion volume of the air/fuel mixture, although dynamic, remains substantially constant from the specified point prior to TDC, through TDC, and until the specified point after TDC when ignition is to occur.

Additionally, the rapid shifting movement of the air/fuel mixture, now under 10 atmospheres of pressure, from one cylinder to the next and back, can assist in better "mixing", resulting in a more thorough explosion and self-consumption of the hydrocarbons at the moment of spark ignition.

The floating piston 140 can be caused to remain seated at the bottom of the floating piston cylinder 144 during a majority of the compression stroke, to seal the compression chamber from the floating piston cylinder and to allow for the full compression of the air/fuel mixture. To accomplish this, pressurized air or exhaust gases can fill the volume of the floating piston cylinder above the floating piston to pre-load the floating piston cylinder to counter-balance or equalize the compressed air/fuel gaseous mixture being received from the working piston cylinder 104 through the common port or aperture 142 between the two chambers. In one aspect, a charge of pressurized exhaust gases can be supplied by venting a small portion of the spent gases existing in the working piston cylinder at BDC prior to the opening of the exhaust valve, and porting the pressurized gases via a connecting line (e.g., hard pipe connection 88) to the top portion of the floating piston cylinder or compression chamber, as shown in FIG. 3b. Check valves can be placed in the hard pipe at both ends to control the charge pressure into the floating piston cylinder, which can be equal to a pressure of the air/fuel mixture, for example, at a 10:1 compression ratio. In another aspect, an off-line or independent source of pressure (e.g., compressed air originating from an air compressor) can also be used to supply charge gases to the floating piston cylinder.

FIGS. 5a-5f serve to illustrate a representative switching process, as the power crank 112 and working piston 120 together rotate from an angular position of −135 degrees before TDC to an angular position of +35 degrees after TDC. At −135 degrees (FIG. 5a), the working piston is in the process of moving upwards within the power cylinder 104 and compressing the air/fuel mixture contained within the compression chamber 126, and the floating piston 140 is firmly seated over the aperture 142 as a result of the pressurized charge gas acting on the opposing side of the floating piston as contained within the upper portion of the floating piston cylinder 144.

With the elimination of the compression chamber's 126 dead space volume, the working piston can reach the peak or desired compression ratio (e.g., 10:1) at about the −35 degrees before TDC position (FIG. 5b), at which point the floating piston 140 is in equilibrium between the compressed air/fuel mixture below and the pressured gas charge above. As the working piston continues to rise while completing the compression stroke, the floating piston lifts off the aperture 142 and the compressed air/fuel mixture begins to flow into the floating piston cylinder 144. This is illustrated in FIG. 5c, where the crank has rotated to about −24 degrees before TDC. At TDC (FIG. 5d) a majority portion of the mixture has been received into the floating piston cylinder, while continuing to comprise a substantially constant volume of compressed air/fuel at a substantially constant compression ratio.

It is to be appreciated that the pressurized gas charge can compress slightly as the floating piston 140 moves upward, which pressure increase will also be transmitted to the compressed air/fuel mixture below. However, because the remaining volume above the floating piston can be quite large in comparison to the volume displaced by the floating piston, this slight increase in pressure can be considered negligible in light of the overall compression of the air/fuel mixture. Additionally, as the working piston begins to move downward after passing TDC the floating piston also begins to descend and push the air/fuel mixture back into the compression chamber (FIG. 5e, +24 degrees after TDC), giving up the slight increase in pressure until the floating piston once again seats on the aperture 142 when the crank arrives at about the +35 degrees after TDC position (FIG. 5f), and the floating piston is again in equilibrium with both the peak compressed air/fuel mixture below and the pressurized gas charge above.

Figure 6:
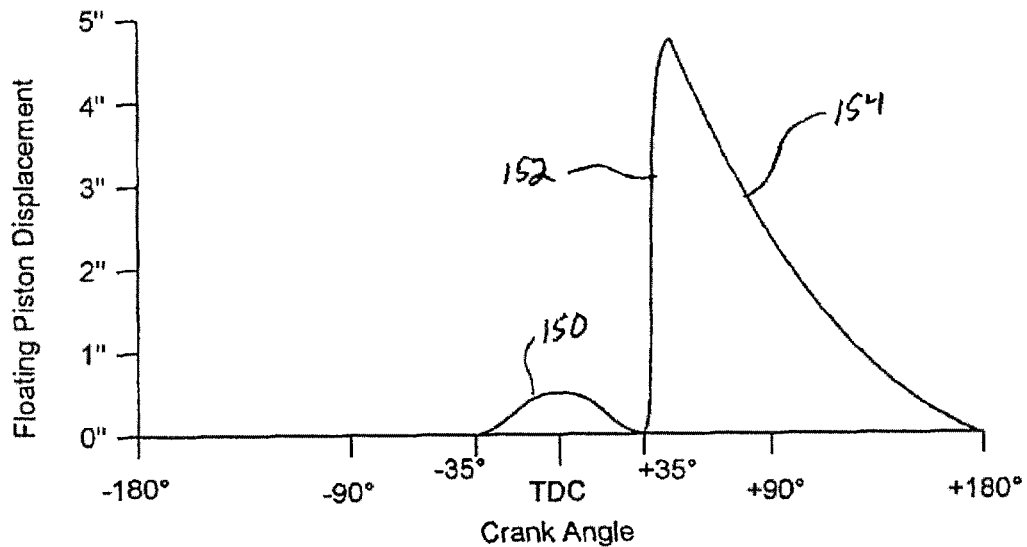
FIG. 6 is a graph illustrating the floating piston displacement vs. crank angle of the IE engine during the compression and power strokes, in accordance with the embodiment of FIG. 5.

The motion of the floating piston during the switching process can be further depicted as curve 150 in FIG. 6, where the floating piston travels up and back down in response to the movement of the air/fuel mixture into and out of the floating piston cylinder. In the representative IE engine shown in FIGS. 1-5 the stroke of the working piston can be about 3" from BDC to TDC. If the volume of the floating piston cylinder is substantially equal to the volume of the compression chamber at BDC, but with a smaller diameter, the floating piston can undergo a displacement of about 0.5 inches during the switching or shifting process. It is understood, however, that the scale of movement is provided only for illustrative purposes and should not considered to be limiting in any form, as the actual displacement of the floating piston can vary widely depending on the geometry of any particular IE engine.

Figure 7:
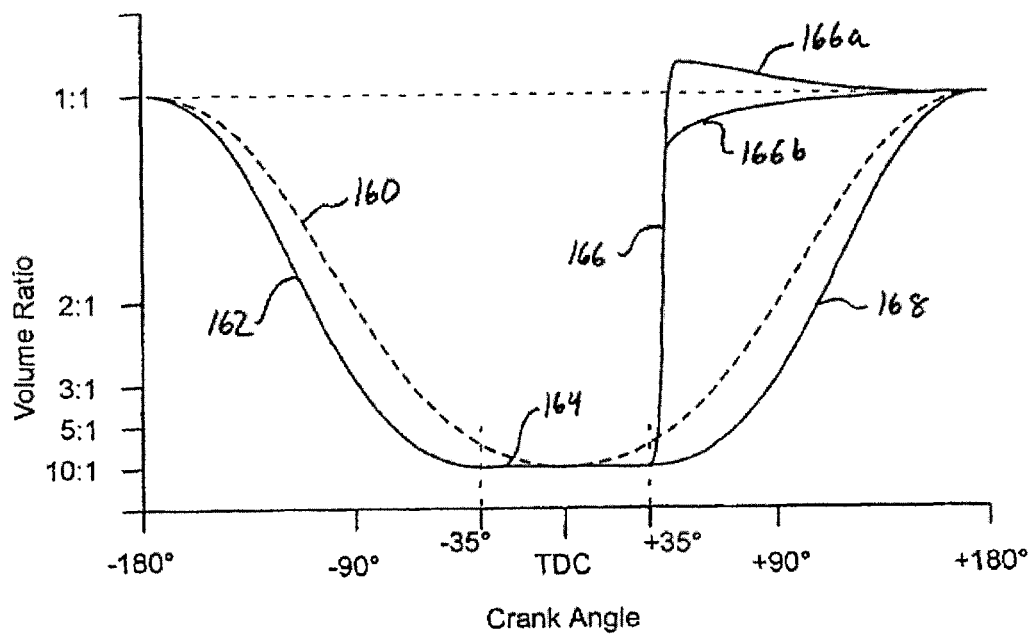
FIG. 7 is a graph illustrating the volume ratio vs. crank angle of the IE engine during the compression and power strokes, in accordance with the embodiment of FIG. 5.

Variations in the volume ratio (e.g. changes in the volume of the compression chamber 126) can be graphically illustrated in FIG. 7, in which the dashed line 160 represents the volume ratio inside a standard IC engine cylinder, while the solid lines 162-168 represent changes in the volume ratio that can take place inside various embodiments of the IE engine cylinder. As can be seen, the volume ratio is 1:1 (or zero compression) for both engine types at the −180 degree and +180 degree positions, which is the BDC position at the beginning of the compression stroke and at the end of the power stroke, respectively.

Unlike a standard IC engine 160 where the volume ratio follows a simple sinusoidal pattern, and reaches the maximum compression (e.g. minimum volume) for the enclosed compression chamber 126 at TDC, the representative IE engine shown in FIGS. 5a-5f comprises a volume ratio that rapidly increases (as the enclosed volume decreases) until the peak or maximum volume ratio is reached as predetermined and at the point where shifting initiates. In the representative embodiment shown, this point is at −35 degrees before TDC as referenced by line segment 162. Between −35 degrees before TDC and +35 degrees after TDC the volume ratio can be caused to remain substantially constant, referenced by line segment 164. Detonation can then take place at +35 degrees after TDC, after which the volume ratio of the IE engine can follow representative line segments 166 or 168, depending upon the configuration of the IE engine and as described in more detail below.

It is to be understand, furthermore, that the volume ratio referred to in FIG. 7 is illustrative of the changes in the actual volume of the compression chamber 126 bounded by the head end or top surface 122 of the working piston 120, the power cylinder 104, the cylinder head 106 and the volume of the floating piston cylinder 144 under the floating piston 140 that is in fluid communication with the power cylinder chamber 104 through aperture 142. The volume ratio of FIG. 7 does not refer to the changes in the compression ratio of the air/fuel mixture as it undergoes compression and detonation, which variation can be significantly greater than shown in FIG. 7

It is also to be appreciated that while shifting from −35 degrees before TDC to +35 degrees after TDC can be considered one beneficial configuration, other shifting ranges and starting/ending angular positions are also possible and can be considered to fall within the scope of the present invention. For example, it is possible to provide the charge gas above the floating piston with more pressurization, which can act to delay the onset and reduce the duration of the shifting from about −20 degrees before TDC to about +20 degrees after TDC. Similarly, it is also possible to provide the charge gas above the floating piston with less pressurization, which can function, for example, to speed up the onset and extend the duration of the shifting from about −60 degrees before TDC to about +60 degrees after TDC. Such changes can affect the transition of the reaction from a combustion-type reaction to an explosion-type reaction, as well as the peak pressure and temperatures achieved after detonation or ignition. In one representative embodiment, moreover, the starting/ending angular positions and shifting ranges can be dynamically controlled through active manipulation of the pressure of the charge gas in the floating piston cylinder above the floating piston, along with the angular timing of detonation or ignition.

Referring back to FIGS. 5f and 5g, detonation of the air/fuel mixture can take place when the angular position of the crank reaches the desired mechanically advantageous position (in this case about +35 degrees after TDC), as described above. Indeed, more than 50% of torque generated at the maximum torque condition (e.g. 90 degrees past TDC) can be realized at the +35 degree position (see FIG. 8). The reduced resistance of the power linkage in this alignment encourages the transformation of the internal reaction from a (relatively) slow-burning combustion to a rapidly-expanding quick-burn explosion by allowing for the immediate expansion of the combustion volume located within the compression chamber 126, particularly as a high compression ratio is achieved and maintained. Although loads of varying magnitude can always be present on the crank 112 and are proportionate to the resistance from the transmission and drive-train, these loads are relatively small compared to the "locked" and immovable power linkage condition encountered by prior related IC engines at TDC. Consequently, even heavy loading on the crank offers little resistance when compared to the explosive power of the igniting fuel/air mixture at a rotational position of about +35 degrees past TDC, and allows the detonation or ignition of the air/fuel mixture to progress into an explosive-type reaction.

Explosive mixtures of oxygen and vaporized hydrocarbons that are allowed to expand freely upon detonation or ignition can realize significantly higher pressure and temperature spikes over a much shorter period of time than combustion type-reactions with a similar amount of fuel charge. This phenomenon can be shown graphically in FIGS. 8 and 9, in which the gas pressure and temperature variations encountered inside the combustion chambers of standard IC engines are represented with dashed lines 190 and 192, respectively, and the gas pressure and temperature variations encountered inside the reaction chambers of the IE engine of the present invention, with detonation at or about +35 degrees past TDC, are represented with solid lines 196a and 198a, respectively. As can be seen, the explosive reaction can produce significantly greater pressures and temperatures over a short period of time, and the air/fuel mixtures can be more completely consumed with minimum by-products during the rapidly expanding explosive reaction.

It has been discovered that the +35 degrees past TDC angular position of the crank can provide a more optimum balance between the transformation from a combustion-type reaction to an explosive-type reaction, and the mechanical leverage for the continuous extraction of work energy throughout the remainder of the power stroke. However, partial transformation of the reaction process can occur with the crank angle being as little as +20 degrees past TDC, as manifested by a reduction in waste by-products and the temperature of the exhaust gases. Additionally, the mechanical leverage can continue to be advantageous up to about +60 degrees past TDC. As a result, the effective range for detonation of the air/fuel mixture in the IE engine can extend from about +20 degrees past TDC to +60 degrees past TDC.

Even if such a powerful reaction could be produced inside a standard IC engine with ignition at TDC, the resulting loads imparted on the effectively mechanically locked and immovable power linkage could quickly exceed the material limits of the various components, leading to damage and premature failure of the bearings, connection rods and working pistons, etc. However, the improved alignment of the power linkage of the IE engine at the moment of detonation (FIG. 5g) can immediately and advantageously convert the explosive reaction energy to useful work as the piston moves downward (FIG. 5h), thereby reducing the stresses imparted to the mechanical components even though the pressures and temperatures produced in the explosive-type reaction can be substantially higher. Eventually, a majority of the available energy is imparted to the rotating crankshaft 110, with the added benefit of the exhaust gas temperatures having been reduced to a fraction of those discharged by standard IC engines (see FIG. 9).

In another representative embodiment of present invention, the power output of the IE engine can be increased by incorporating water injection into the explosion to increase the peak pressure and reduce the peak temperature. This can be accomplished by using a water injector 76 (see FIG. 3c) to provide small water droplets into the intake manifold 64 that can be immediately mixed with the smaller droplets or vapors of fuel provided by fuel injector 74. The water droplets and the air/fuel mixture can be drawn together into the cylinder with the vacuum created by the descending working piston as the intake valve 62 begins to open (see FIG. 4d), and the water droplets can be compressed along with the air/fuel mixture through the following compression stroke (including switching) until the crank angle reaches a point after TDC (such as about +35 degrees after TDC), when detonation or firing is initiated.

At the moment of detonation the high temperature gases generated by the exploding vaporized fuel/air mixture can be reacted and cooled by the droplets of water, which in turn are flashed into high-pressure steam. It is to be appreciated that high pressure steam can have a greater expansion ratio (e.g., 1,600:1), compared to the expansion ratio of combusting hydrocarbon fuel mixtures (e.g., 800:1). Thus, the powerfully expanding steam, at approximately 300 degrees Fahrenheit, can increase the available power while at the same time cooling the high temperature spike generated by the exploding fuel.

It is generally accepted that a wavefront of expanding gases is generated when ignition occurs in a typical IC engine chamber. In the present invention IE engine a comparable wavefront can also be generated during the explosion-type reaction, which wavefront can travel proportionately faster in a cylinder where the piston can respond immediately. Thus, even in configurations or embodiments without water injection and steam, the 800:1 expansion of the hydrocarbon air fuel mixture can travel along a wavefront with a greater velocity than can be realized with combustion alone. Moreover, a wavefront produced by detonating or igniting an air/fuel mixture in the presence of water droplets can be combined with the additional high-velocity expanding steam to exert additional force upon the working piston.

Figure 8:
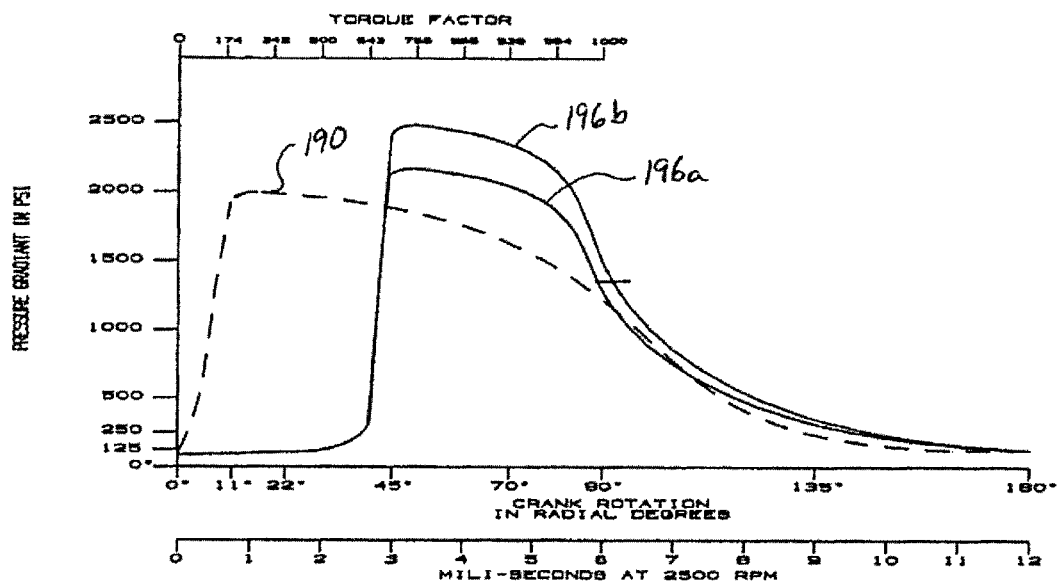
FIG. 8 is a graph illustrating the internal pressure inside the compression chamber vs. crank angle of the IE engine during the power stroke, in accordance with various embodiments of the present invention.
Figure 9:
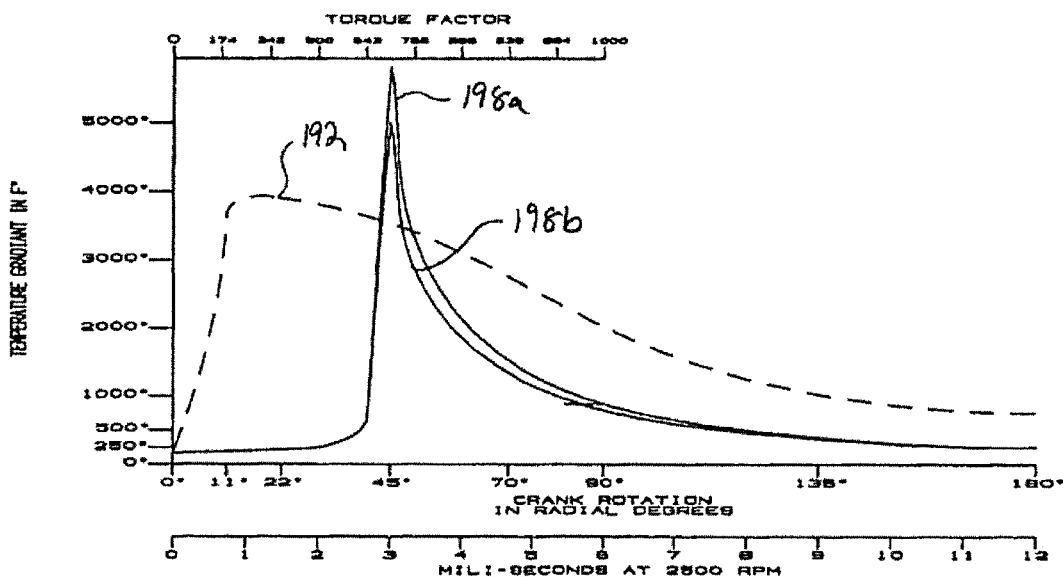
FIG. 9 is a graph illustrating the internal temperature inside the compression chamber vs. crank angle of the IE engine during the power stroke, in accordance with various embodiments of the present invention.

The affects of water injection inside the combustion or reaction chamber of the IE engine are illustrated graphically in FIGS. 8 and 9, where the gaseous pressure with water injection is represented as solid line 196b in FIG. 8, and the gaseous temperature with water injection represented by solid line 198b in FIG. 9. As can be seen, the power output (e.g. pressure) can be increased with the incorporation of water injection into the explosive-type reaction, along with a simultaneous reduction in the peak temperature. As an added benefit, water injection can also significantly reduce or eliminate the formation of nitrous oxide and carbon monoxide waste by-products by reducing the duration of the gaseous mixture at elevated temperatures.

In the representative embodiment of the IE engine shown in FIGS. 5a-5i, in the absence of a TDC mechanical lock and the more favorable moment angle at detonation, and the relatively low resistance on the crankshaft 110 creates an opportunity for more-or-less immediate expansion. Any excess residual physical resistance during expansion due to higher loads on the crankshaft after ignition can be then directed to, and converted to potential energy via the floating piston 140. In other words, the rapid increase of pressure inside the compression chamber 126 will act simultaneously on both the working piston 120 and floating piston 140 to cause them to move away from each other. During expansion the working piston 120, in its more favorable position past TDC, will deliver work to the crankshaft 110 as it is able, depending upon the load, and the floating piston 140 will absorb the balance of the expansion while at the same time compressing the charge of gases trapped in the upper portion of the floating piston cylinder 144. The process of pressurizing the charge gases above the floating piston is known as accumulation, and is illustrated in FIG. 5g. This accumulated pressure can then act to create mechanical work residually back through the power cylinder 104 and working piston 120 to the crankshaft 110 as the compressed volume of charge gas above the floating piston chamber expands while maintaining a high pressure head on the volume of reaction products contained within the compression chamber 126.

After detonation and accumulation the crankshaft continues to rotate around toward BDC while the working piston moves downward, causing the volume between the working piston 120 and the floating piston 140 to increase with a corresponding decrease in pressure. Simultaneously, the high pressure volume of charge gas above the floating piston seeks equalization with the decreasing pressure below, forcing the floating piston to follow downward as well. The offset crank 112 of the crankshaft 110 continues to rotate along its sinusoidal path through +90 degrees past TDC (FIG. 5h), where the resistance offered by the transmission and drive train can be minimized by the moment angle of the crank. This leads to an increase in the work advantage being applied to the working piston 120 by the still highly-pressurized gases, with the potential energy previously stored as pressure during pressurization in the charge gas being converted back into work energy as it is transferred back through the floating piston and onto the descending working piston, well after the TDC position.

The pressure between the two cylinders continues to decrease as both pistons move downward (FIG. 5i). Following a period of pressure and temperature reduction as energy is extracted by the working piston throughout the crankshaft's rotation, the temperature can be reduced to near ambient conditions by the time the working piston reaches BDC, at which point the exhaust valve is opened to vent the remaining exhaust gas pressure to the open atmosphere.

Accumulation can be depicted graphically by line segments 152 in FIG. 6, which illustrates the immediate displacement of the floating piston at detonation towards the top of the floating piston cylinder, where the volume of charge gas is compressed to a thin layer. This is followed by the slower, downward movement 154 as the compressed volume of charge gas expands to maintain the high pressure head on the gases contained within the compression chamber 126.

Accumulation can also be depicted graphically by line segments 166 in FIG. 6, which illustrates the immediate expansion in the volume of the compression chamber 126 with the addition of the volume of the floating piston cylinder 144. It is to be appreciated that if the volume of the floating piston cylinder 144 under the floating piston 140 is greater than or comparable with the volume of the working piston cylinder 104, the volume ratio can overshoot the 1:1 reference line (line segment 166a) and gradually move back to 1:1 at BDC. Similarly, if the volume of the floating piston cylinder under the floating piston is less than the volume of the working piston cylinder, the volume ratio will see a partial jump as the volume of the floating piston cylinder is added to the compression volume 126 (line segment 166b), which then gradually moves upwards to 1:1 at BDC.

FIGS. 11a-11d illustrates a series of sectional views detailing the functionality of the floating piston as it traverses vertically downward after accumulation, and features a method for providing deceleration at the end of the power stroke, near the combustion chamber.

Figure 11A:
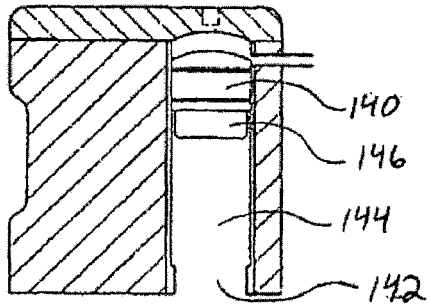
FIGS. 11a-11d together illustrate a series of sectional views of the sequencing of the floating piston of the IE engine, in accordance with the embodiment of FIG. 5.
Figure 11B:
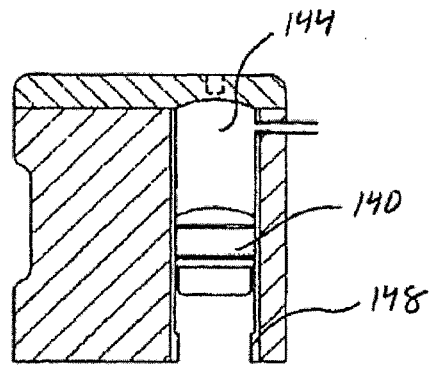
Figure 11C:
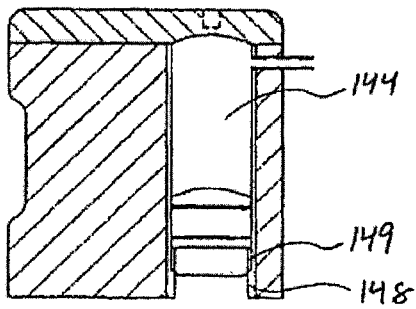
Figure 11D:
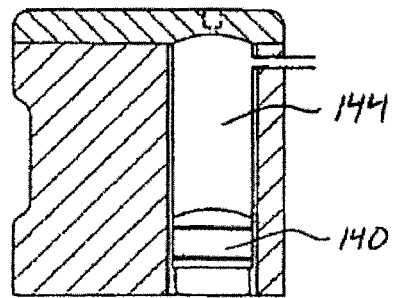

During the power stroke the floating piston traverses linearly from its bottom position to near the top of its travel limit at detonation or ignition and then returns to seal against the aperture 142. FIG. 11a illustrates the position of the floating piston near the top of the floating piston chamber 144 following detonation, while FIG. 11b shows the floating piston traversing linearly downward, midway towards the bottom position. FIG. 11c illustrates the floating piston within a few millimeters of the bottom position, and beginning an engagement between a stepped surface 146 on the floating piston and a stepped surface on the cast iron liner 148, which can be referred to as a "soft-landing" feature. A small annular air pocket 149 can be formed as a result of the initial engagement between the two steps and as the floating piston finishes its travel towards the bottom position, with the air trapped in the small pocket being compressed to offer resistance opposite to the direction of travel of the floating piston. The resistance caused from the pressure increase in the small soft-landing air pocket 149 creates a force against the floating piston, dampens the inertia and overcomes the weight and the momentum of the floating piston's downward velocity. FIG. 11d shows the floating piston at rest in the bottom position following a velocity deceleration.

Figure 12A:
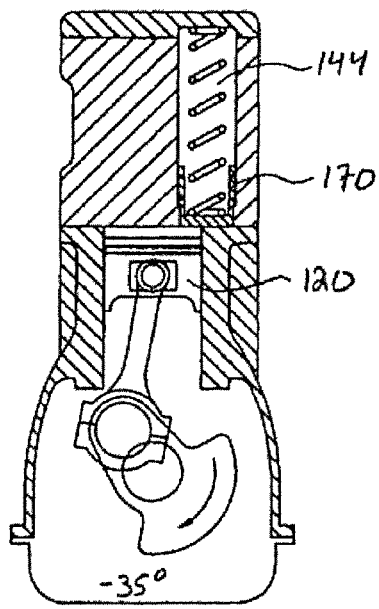
FIGS. 12a-12d together illustrate a series of sectional views of the sequencing of the compression and power strokes of the IE engine, in accordance with another representative embodiment of the present invention.
Figure 12B:
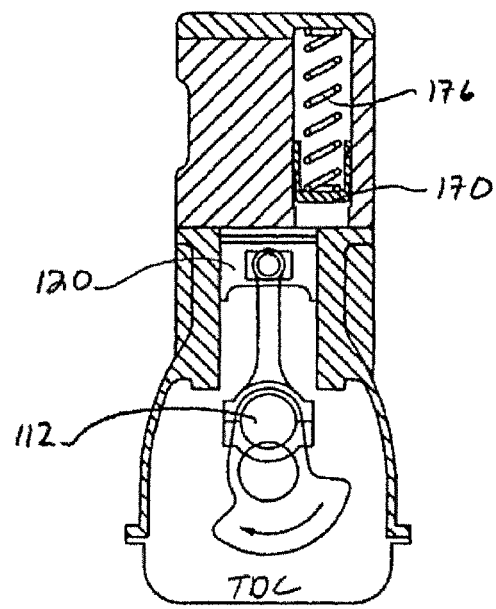
Figure 12C:
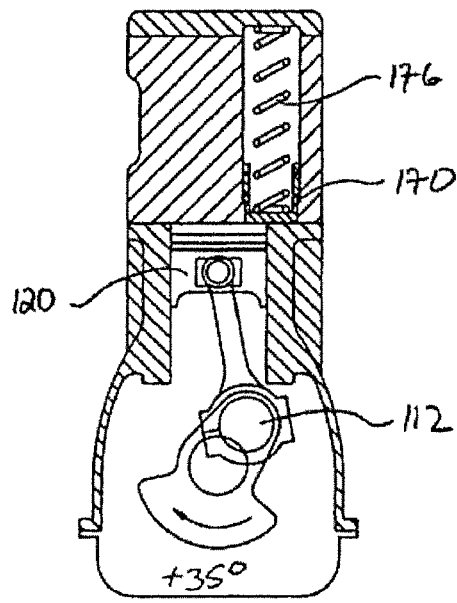

FIGS. 12a-12d together illustrate the operation of one variation of the IE engine described above, in which the pressurized gas floating piston is replaced with a truncated spring-loaded piston 170 having a compression spring 176. The compression spring can extend the length of the floating piston cylinder 144, and can be pre-loaded to seat the spring-loaded piston 170 within the aperture separating the working piston cylinder 104 from the floating piston cylinder during the early portions of the compression stroke, up to and including a crank position of −35 degrees before TDC (FIG. 12a). The outer surface of the spring-loaded piston 178 (FIG. 12d) can be stepped to provide the sealing surface that seals against the stepped inside surface of the cast iron liner.

Similar to the gas-charged floating piston described above, the spring-loaded piston can displace to allow for switching of the air/fuel mixture into and out of the floating piston cylinder as the crank moves from −35 degrees before TDC, through TDC (FIG. 12b) and to +35 degrees after TDC (FIG. 12c), to maintain a constant compression ratio across the upper ranges of the compression and power strokes. The compression spring 176 offering resistance and placed on the opposite side of the spring loaded piston 170 can be manufactured to re-act to and provide the force necessary to contain the pressure of the gases at the 10:1 compression ratio.

Figure 12D:
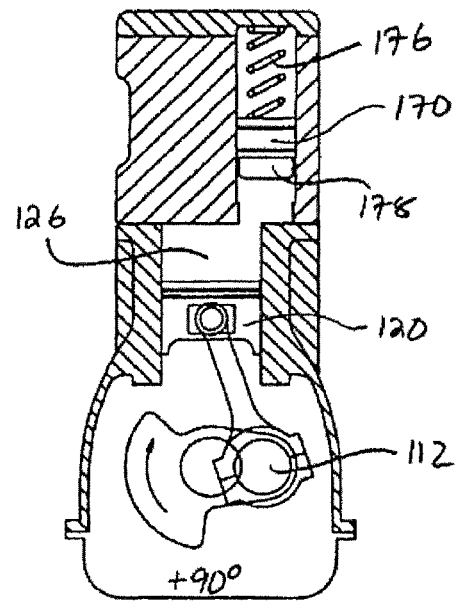

In response to detonation at about +35 degrees after TDC, the spring-loaded piston can also displace upwards towards the top of the floating piston cylinder to absorb or accumulate excess potential energy within the compression spring 176, which energy can be subsequently released to the working piston 120 as the crank 112 continues to rotate downward during the remainder of the power stroke (FIG. 12d). The crucial feature of using a spring allows the elimination of compressed air in the cylinder, although noted, compressed air can still be supplied by the hard pipe connection shown in FIG. 3b to increase overall efficiency.

Figure 13A:
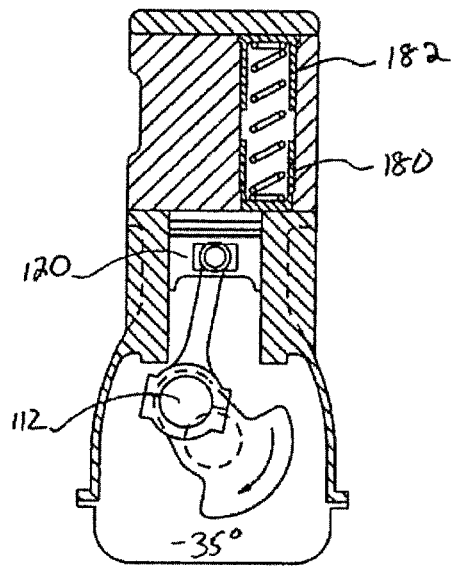
FIGS. 13a-13d together illustrate a series of sectional views of the sequencing of the compression and power strokes of the IE engine, in accordance with yet another representative embodiment of the present invention.
Figure 13B:
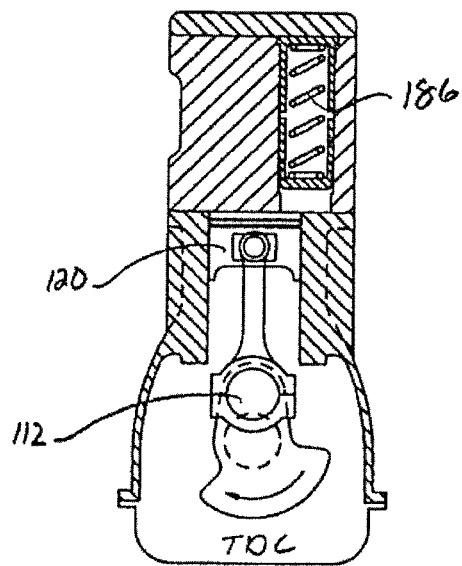
Figure 13C:
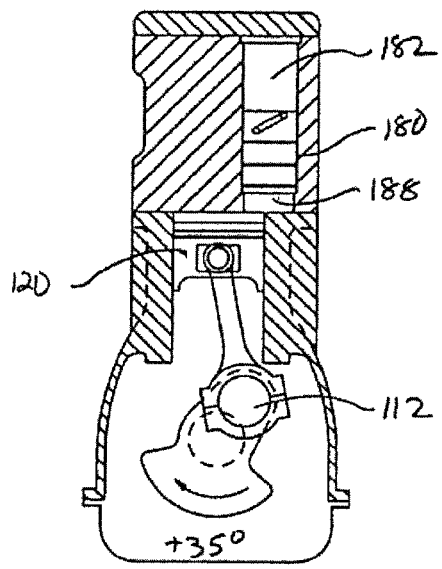

FIGS. 13a-13d together illustrate the operation of another variation of the IE engine described above, in which the pressurized gas floating piston is replaced with two truncated spring-loaded pistons 180, 182 separated by a compression spring 186. The compression spring can extend the length of the floating piston cylinder 144, and can be pre-loaded to seat the lower spring-loaded piston 180 within the aperture 142 and the upper spring-loaded piston 182 against the top of the floating piston cylinder. The lower spring-loaded piston 180 can have a stepped outer surface 188 (FIG. 13c) to provide the sealing surface that seals against the stepped inside surface of the cast iron liner, and can function to seal the working piston cylinder 104 from the floating piston cylinder 144 during the early portions of the compression stroke, up to and including a crank position of −35 degrees before TDC (FIG. 13*a*).

Similar to the gas-charged floating piston described above, the lower spring-loaded piston 180 can displace to allow for switching of the air/fuel mixture into and out of the floating piston cylinder as the crank moves from −35 degrees before TDC, through TDC (FIG. 13*b*) and to +35 degrees after TDC (FIG. 13*c*), to maintain a constant compression ratio across the upper ranges of the compression and power strokes. The compression spring 186 offering resistance and placed on the opposite side of the spring loaded piston 180 can be manufactured to re-act to and provide the force necessary to contain the pressure of the gases at the 10:1 compression ratio.

Figure 13D:
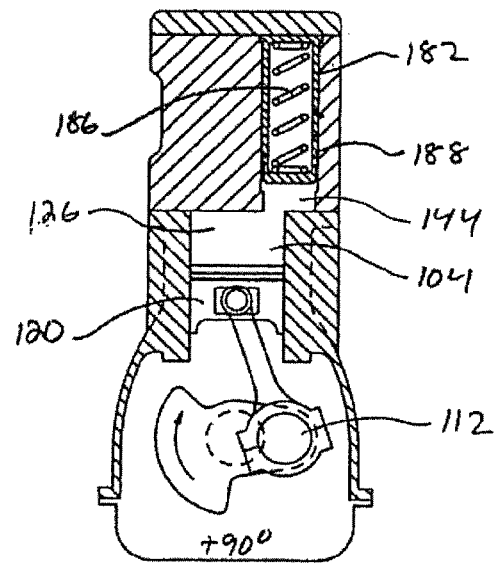

In response to detonation at about +35 degrees after TDC, however, the travel of the truncated spring-loaded piston 180 can be only long enough to compress a small volume of air in the floating piston compression chamber before contacting the upper spring-loaded piston 182 (FIG. 13*d*). In this condition, only a limited accumulation of energy can be stored, and some efficiency can be lost. It is expected that the majority of the work energy created by expansion following detonation will act on the crankshaft directly.

Illustrated in FIGS. 14*a* and 14*b* is another representative embodiment 200 of the present invention for maintaining the compressed air/fuel mixture of a reciprocating-piston engine at a constant volume and at a given compression ratio, such as a peak compression ratio, through a range of crank positions, and delaying detonation of the compressed air/fuel mixture until the working piston has passed through the top dead center position and the engine crank has rotated to a more mechanically advantageous position that allows the resulting explosive reaction products to perform more work and generate additional torque.

Instead of using the floating piston and floating piston cylinder to perform a "switching" process, embodiment 200 of the IE engine can instead employ a unique power linkage 208, hereinafter known as a "CRAM power linkage" or "CRAM", to maintain the compressed air/fuel mixture at a constant volume and at a peak compression ratio through a range of crank positions (CRAM being an acronym for the term "CRank cAM"). CRAM can also entail several major changes to the standard IC engine, including modifications to the power crank 212, the connecting rod 216, and the head end 230 of the power cylinder 206. And although not used to maintain the compressed air/fuel mixture at a constant volume and at a peak compression ratio, the floating piston 240 and floating piston cylinder 244 can still be included with CRAM embodiment 200 to provide accumulation after detonation has taken place.

FIGS. 14*a* and 14*b* are sectional views which together illustrate an engine block 202 and engine head 204 assembled together to form a representative embodiment 200 of the IE engine of the present invention. Each power cylinder in the IE engine 200 can include the crankshaft 210, a camshaft 212, a connecting rod 216, a working piston 220, a head cavity 232 and a floating piston 240/floating piston cylinder 344 accumulator. The head cavity 232 can be a depression formed in the head end 230 of the power cylinder that provides a dead space volume between the top surface 222 of the working piston and the engine head 206 when the working piston 220 is in the TDC position, and can function as a reservoir for the compressed fuel/air mixture. Also shown are intake and/or exhaust valves 236 which can be projected into the head cavity 232 at the appropriate times through the rotation of the valve cam 238, to open the intake and/or the exhaust ports 234 and allow gases to flow into and out of the compression chamber 226. The valves can freely open, but their travel is limited to within the confines of the head cavity. As described in more detail below, the head cavity 232 can be cylindrical with a flat upper surface, or can be rounded around the perimeter edges to form a hemispherical volume commonly known as a "hemi."

With embodiment 200 of the IE engine, the constant volume and the peak compression ratio of the air/fuel mixture can be maintained throughout a range of crankshaft angular positions because of a cam surface 214 formed into the journal surface or "lobe" of the CRAM crank or throw 212, and a follower surface 218 formed into the mating bearing bore of the CRAM connecting rod 216, as shown in more detail (and exaggerated for effect) in FIGS. 15*a* and 15*b*. At a predetermined point in the rotation of the power throw 212, the cam surface 214 and follower surface 218 can interact to alter the natural sinusoidal movement of the connecting rod, thus altering the linear motion of the working piston. Stated differently, this interaction can create a static dwell or pause in the linear travel of the working piston 210, even as the crankshaft and power throw continue to rotate. If the cam and follower surfaces are configured correctly, this static dwell can be centered around TDC, so that the working piston stops its upward linear travel for a predefined number of degrees prior to TDC, and delays its downward linear motion until reaching a predefined number of degrees after to TDC.

As a result, with the CRAM power linkage 208 it is possible to halt the linear motion of the working piston 220 when the crankshaft 210 reaches a given rotational position, such as a position of −35 degrees prior to TDC, then "hold" the working piston statically while the crankshaft moves rotationally toward TDC and beyond to a more angularly advantageous rotational position, such as a position of +35 degrees past TDC. At that position, detonation or ignition can take place to initiate an explosive-type reaction, as described hereinabove. The sequence of events using the CRAM linkage to maintain the compressed air/fuel mixture at a constant volume and at a peak compression ratio in order to delay detonation of the gases until the working piston has passed beyond the top dead center position is shown in more detail in FIGS. 16*a*-16*i*.

Figure 10:
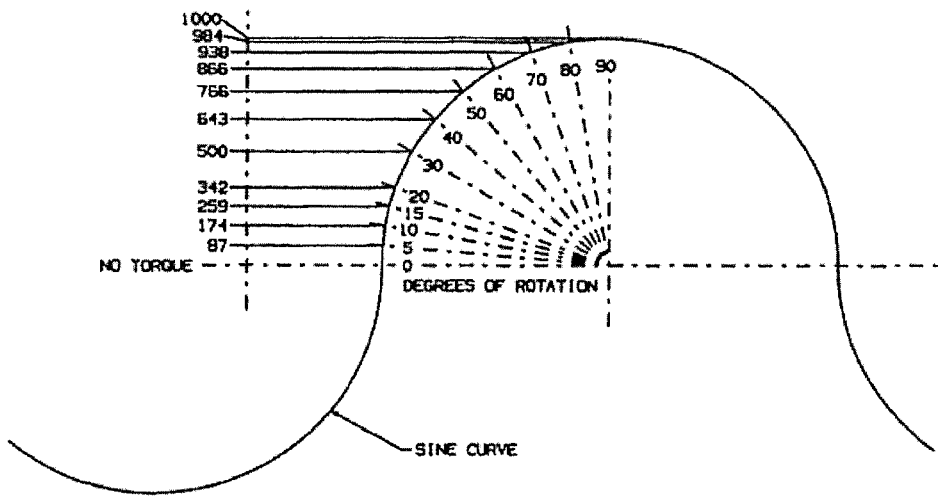
FIG. 10 is a graph illustrating the torque vs. crank angle of the IE engine during a sinusoidal movement of the piston.
Figures 16A, 16B, 16C, 16D, 16E, 16F, 16G, 16H, 16I:
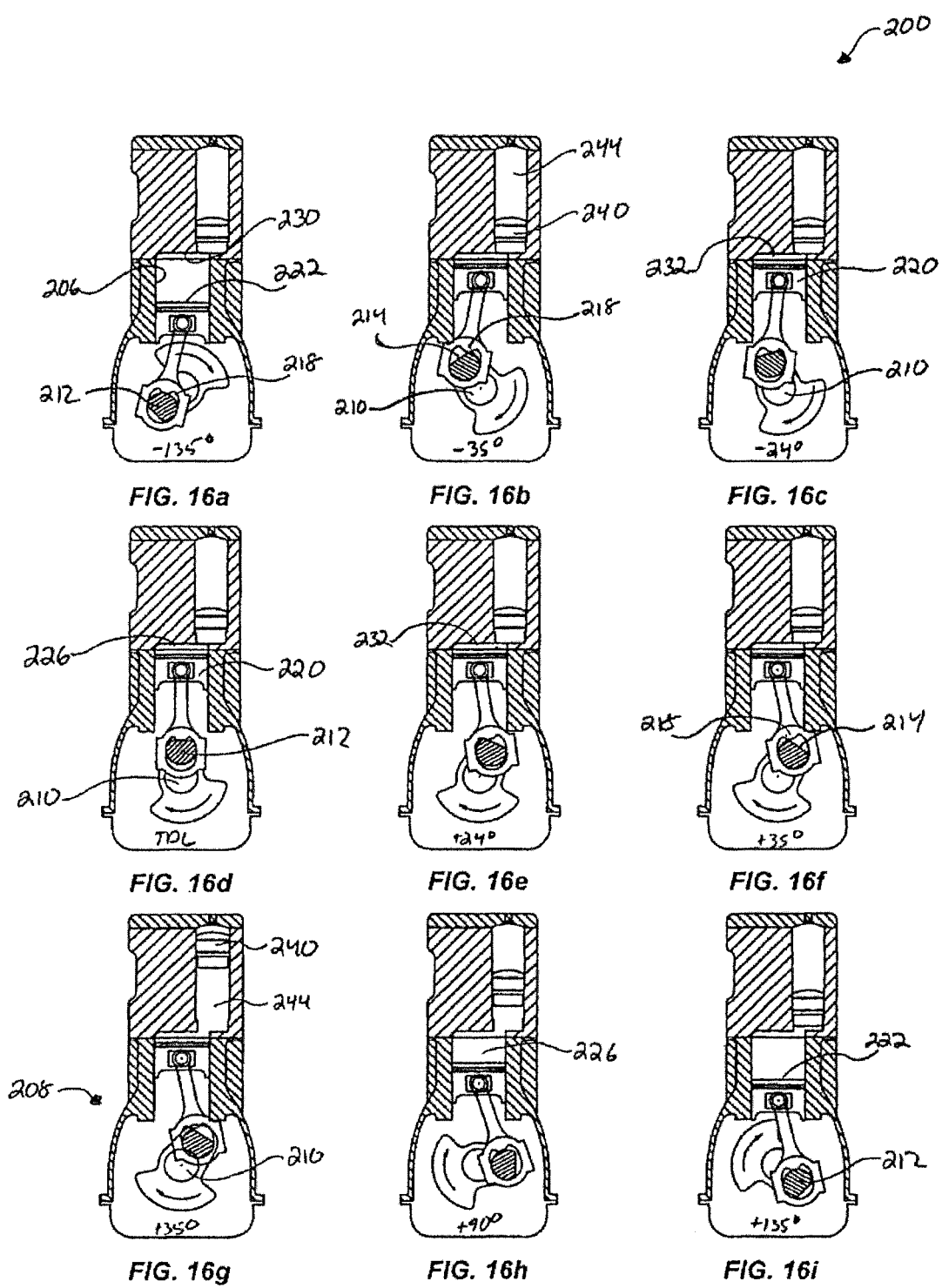
FIGS. 16a-16i together illustrate a series of sectional views of the sequencing of the compression and power strokes of the IE engine, in accordance with the embodiment of FIG. 14.

As illustrated in FIG. 16*a* (−135 degree before TDC), during the first part of the compression stroke the partial radial surface of the throw lobe 212 of the crankshaft 210 operates concentrically with the partial radial surface of the connecting rod 216. At −35 degrees prior to TDC (FIG. 16*b*) the cam surface 214 of the crankshaft throw lobe and the follower surface 218 of the connecting rod are forced together due to downward pressure applied by the working piston 220. The two surfaces begin to interact and generate a physical condition whereby the working piston is halted in its travel within the power cylinder 206 and maintained at a constant distance form the head end 230 of the power cylinder 230. This spacing can be maintained through the subsequent 70 degrees of radial rotation of the crankshaft 210 (FIGS. 16*c*-16*e*). When the crankshaft has moved past TDC and has reached a radial rotation of +35 degrees past TDC (FIG. 16*f*, the cam 214 and follower 218 surfaces complete their elliptical traverse and continue radially in a concentric rotation, followed by detonation at +35 degrees past TDC (FIG. 16*g*) with the power crank or throw 212 of the crankshaft at 55-60% of its optimum moment angle, or "moment arm" efficiency (see FIG. 10).

As can be seen in FIGS. 16*a* through 16*f*, the floating piston 240 does not move from its sealing position over the aperture between the power cylinder 206 and the floating piston cylinder 244 until after detonation has occurred. This is because the top surface 222 of the working piston has stopped at the lower boundary of the head cavity 232 formed in the head end 230 of the power cylinder, and the entire volume of compressed air/fuel mixture contained within the compression chamber 226 is now forced into the head cavity depression. The head cavity 232 can be sized with a volume that is 1/10th the volume of the compression chamber 226 with the working piston 220 at BDC, so that a high compression (e.g., one of 10:1) can achieved and maintained during the entire period that working piston is halted as the throw 212 of the crankshaft 210 rotates towards +35 degrees after TDC. With the charge of gases above the floating piston pressurized at or above the 10:1 compression ratio, the floating piston can remained seated until after detonation to maintain the integrity of the head cavity 232.

The CRAM linkage can be combined with a head cavity 232 having a cylindrical head configuration or a "hemi" head configuration, as illustrated in FIGS. 14 and 16. In recent years a popular style of head cavity, commonly known as a hemi, was developed in standard IC engines to increase the efficiency of the combustion burn by directing, or reflecting the reverberating expansion of gases toward the center of the combustion chamber, thus more completely focusing the forces towards the center of the top surface 222 of the working piston. The present invention 200 can also feature the hemi shape in the head cavity 232 to further redirect and focus the energy produced in the explosive reaction.

With the CRAM power linkage 208 in the mechanically advantageous position of about +35 degrees after TDC and the partial radial surface of the throw lobe 212 again operating concentrically with the partial radial surface of the connecting rod 216, detonation of the air/fuel mixture can be initiated with the same effect as the detonation of embodiment 100 described above. Furthermore, the floating piston 240 and floating piston cylinder 244 can also become active to provide the additional benefits of accumulation for the remainder of the power stroke (FIGS. 16g-16i), also as described hereinabove. If the floating piston 240 and floating piston cylinder 244 are combined with the CRAM power linkage, the volume ratio vs. crank angle of the compression chamber can again follow line segment 166 illustrated in FIG. 7. However, if the CRAM power linkage is used separately, and without the floating piston 240/floating piston cylinder 244 so that accumulation is not included during the power stroke, the volume ratio vs. crank angle of the compression chamber can instead follow line segment 168 as the working piston returns to BDC.

The designer of an IE engine built in accordance with the present invention has thus been provided with various mechanisms for maintaining the compressed air/fuel mixture at a constant volume and compression ratio until the engine crank has rotated to a more mechanically advantageous position that encourages an explosive-type reaction, for example, the floating piston with the floating piston cylinder, and the CRAM power linkage. Although each mechanism can function separately to encourage the transformation of the chemical reaction from a combustion-type reaction to an explosive-type reaction, it is to be appreciated that combinations of the two mechanisms are also possible and are considered to fall within the scope of the present invention.

FIGS. 17a-17d together illustrate the operation of a variation 250 of the CRAM IE engine in which the pressurized gas floating piston is replaced with a truncated spring-loaded piston 252 having a compression spring 256. Similar to the previously described switching embodiment variation shown in FIGS. 12a-12b, the compression spring can extend the length of the floating piston cylinder 244. However, in this variation the spring can be pre-loaded to seat the spring-loaded piston 252 within the aperture separating the working piston cylinder 206 from the floating piston cylinder throughout the entire compression stroke and early portions of the power stroke, up to and including a crank position of +35 degrees after TDC (FIGS. 17a-17c).

In response to detonation at about +35 degrees after TDC, the spring-loaded piston 252 can then displace upwards towards the top of the floating piston cylinder to absorb or accumulate excess potential energy within the compression spring 256, which energy can then be released back to the working piston 220 as the crank 212 continues to rotate downward during the remainder of the power stroke (FIG. 17d). The use of a spring allows the elimination of compressed air in the cylinder, although as noted, compressed air or spent exhaust gases can still be supplied by the hard pipe connection shown in FIG. 3b to increase overall efficiency.

Illustrated in FIGS. 18a-18b is a representative embodiment 260 of the CRAM power linkage having a tangential/pitch cam surface formed on the lobe of the power crank or throw 112. The term "pitch" is due to the truncated shape 264 on the circular portion of the crankshaft lobe 262, and a corresponding truncated shape 268 on the circular portion of the bearing or bore 266 formed inside the crank-hub of the connecting rod 216. These truncated surfaces are positioned and mated to operate as a cam and a cam track, respectively. The cam surface 264 on the crankshaft lobe can be concentric and tangential with the geometric concentricity of the throw of the crankshaft, while the cam track surface 268 within the crank-hub end of the rod can be concentric and tangential with the geometric concentricity originating from the center of the piston-hub of the rod at its opposite end.

During operation of the tangential/pitch CRAM 260 (FIGS. 18c-18f), the cam 264 and cam track 268 surfaces within the crankshaft and rod, respectively, can begin to mate when the crankshaft reaches −35 degrees prior to TDC. As their shapes have been geometrically oriented from their respective "swing points", the reciprocating motion of the piston 220 can be transformed from a sinusoidal to a static condition, until a crankshaft rotation of +35 degrees past TDC is reached. During this 70 degrees of rotation before, up to and past TDC, the piston can enjoy a static condition of non-movement due to the exact "pitch-line" pathway followed by the cam and cam track, similar to the pitch line engagement of two mating gears.

The tangential/pitch CRAM can offer a high degree of efficiency during the static dwell of the piston from −35 degrees before TDC to +35 degrees past TDC. At this point, the piston can resume a normal reciprocating rotational pattern until reaching 325 degrees (or −35 degrees). It will be noted that when the crank position is at +35, the connecting rod is "swagged" or angled from its TDC vertical position and has gained approx 11 degrees. As shown with the torque graph provided in FIG. 10, about 575 ft/lbs torque (of a possible 1,000 ft/lbs torque) is available at the +35 degree angular position of the crankshaft. However, the additional 11 degrees can be added to create a greater preponderance angle of approx 46 degrees, for a total of 710 ft/lbs torque (or 71%) which can be applied to the crank (out of a possible 1,000 ft/lbs).

Figure 19A:
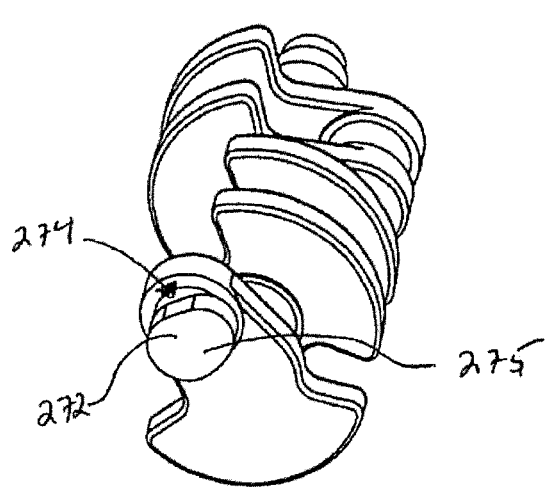
FIGS. 19a-19f together illustrate perspective views of yet another representative CRAM linkage and sectional views of the same during sequencing through the compression and power strokes of the IE engine, in accordance with an embodiment of the present invention.
Figure 19B:
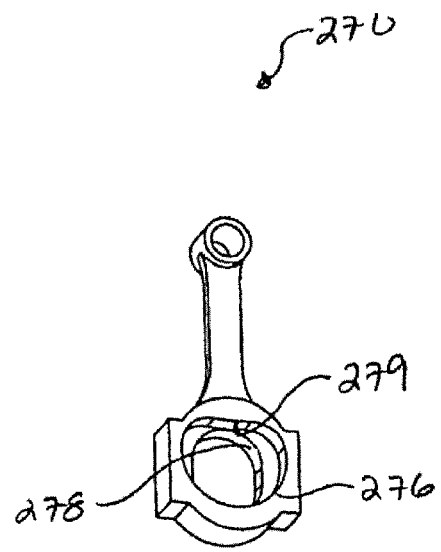
Figure 19C:
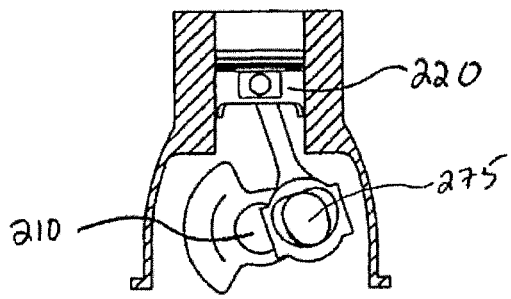
Figure 19D:
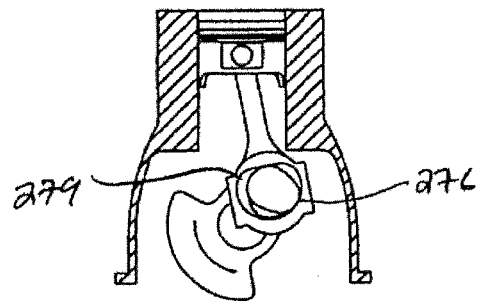
Figure 19E:
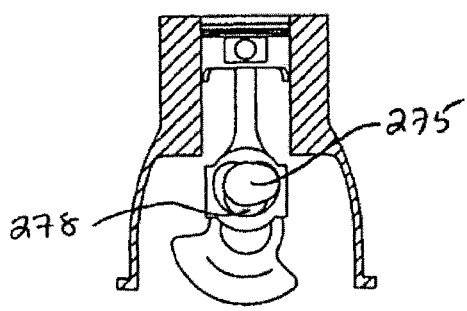
Figure 19F:
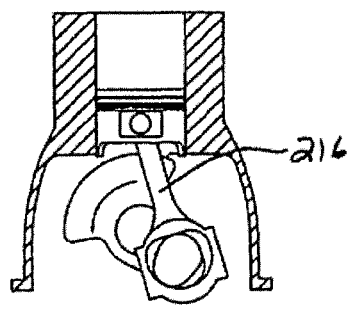

Illustrated in FIGS. 19a-19b is another representative embodiment 270 of the CRAM power linkage having somewhat of a "heart-shaped" cam surface formed on the lobe 272 of the power throw 112. The term "heart" is due to the heart shape of the cam track follower 279 located in the connecting rod bearing 276 that is able to generate and enable the desired motion. The heart CRAM embodiment 270 utilizes a cam shape designed to cause a static dwell to the piston 220 at about 30 degrees prior to and following the crankshaft lobe's TDC position. Two cam components, one having a circular shape 274 and the other with a harmonic shape 275, can be nested side-by-side on the lobe 272 of the power throw 212.

During operation of the heart CRAM 270 (FIGS. 19c-19f), the circular cam mates with a corresponding slot 278 in the follower and forces the connecting rod 216 to move in a side-to-side oscillation pattern during normal crankshaft rotation (similar to the rod movement in standard engines). During this normal oscillation, the harmonic cam 275 rotates and is also forced to follow the outside heart-shaped cam track 279 located in the rod bearing 276 and create the desired static dwell alteration to the normal reciprocating motion of the piston. The mating of the harmonic cam 275 to the heart shaped cam track 279 maintains the motionless position of the piston relative to the top of the combustion chamber to facilitate the desired compression of the fuel/air mixture, prior to ignition.

The working piston 220 of the heart CRAM embodiment 270 enjoys a static dwell at TDC which continues from −30 thru to +30 degrees past TDC, after which the piston resumes a normal reciprocating rotational pattern until reaching 330 degrees (or −30 degrees). It will also be noted that when the crank position is at +30 degrees after TDC, the rod has "swagged" side-to-side from its TDC vertical position and has gained approx 10 degrees. As shown with the torque graph provided in FIG. 10, about 500 ft/lbs torque (out a possible 1,000 ft/lbs) is available at the +30 degree angular position of the crankshaft. However, the additional 10 degrees can be added creating a preponderance angle of approx 40 degrees, for a total of 643 ft/lbs torque, (or 64%) which can be applied to the crank (out of a possible 1,000 ft/lbs).

Illustrated in FIGS. 20a-120b is another representative embodiment 280 of the CRAM power linkage having a "cross" cam surface formed on the lobe 282 of the power crank or throw 112. The term "cross" is due to the replacement of the single cam track with two circular shaped lobes, and differs from tangential/pitch embodiment described above as the piston head experiences a modified sinusoidal path rather than static dwell during rotation of the power throw 212.

The lobe 282 can be divided into two circular components, the first component being concentric 284 with the normal position of the throw of the crankshaft's lobe, and the second component being offset 285 from the first by 13 degrees. The bearing bore 286 of the connecting rod 216 can also be configured with two slots, the first oriented vertically 288 to the length of the rod, and the second perpendicular 289 to the first, or horizontally to the length of the rod. Each of these slots are formed into one half (½) of the thickness of the bearing bore, and correspond proportionately to the thickness of each of the lobe components 284, 285 on the crankshaft.

During operation of the cross CRAM 280 (FIGS. 20c-20f), the first lobe component 284 drives the side-to-side swag of the rod during the crankshaft's rotation, while the second lobe component 285 provides a truncation in the normal reciprocation motion of the piston during crankshaft rotation, in a fashion or pattern similar to the movement provided by a "Scottish yoke" mechanism. No static dwell is possible as a result of this sinusoidal configuration, however, due to the second lobe's 285 eccentric offset, the piston 220 itself does not reach TDC until after the crank 212 has passed its rotational TDC position. Thus, a shortened period of "near static" movement of the piston can be realized.

When the crank reaches +30 rotational position, the angle of the lobe 282 from vertical is 18 degrees. The swag of the connecting rod provides an additional 7 degrees for a total of 25 degrees, or 422 ft/lbs torque (out of a possible 1,000 ft/lbs, see FIG. 10). Furthermore, during this condition of "near static" dwell the mating of the rod's two crossed slots 288, 289 to the two fixed crankshaft lobes 284, 285 offers a "near motionless" position of the working piston 220 relative to the distance to the top of the combustion chamber to facilitate the desired compression of the fuel/air mixture, prior to detonation.

Figure 21A:
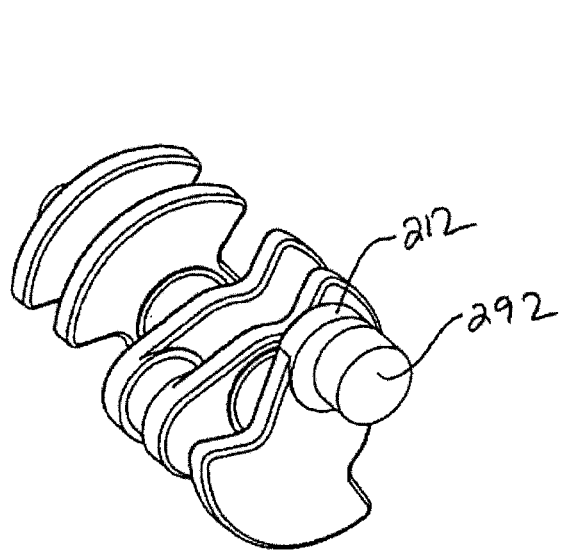
FIGS. 21a-21f together illustrate perspective views of yet another representative CRAM linkage and sectional views of the same during sequencing through the compression and power strokes of the IE engine, in accordance with an embodiment of the present invention.
Figure 21B:
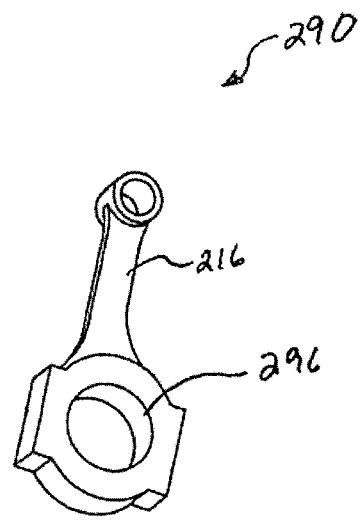
Figure 21C:
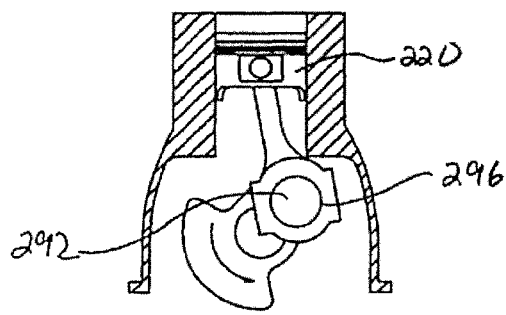
Figure 21D:
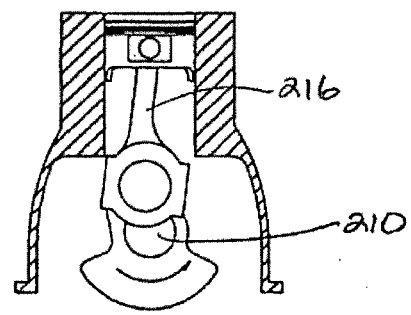
Figure 21E:
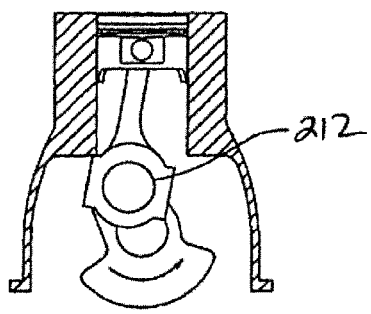
Figure 21F:
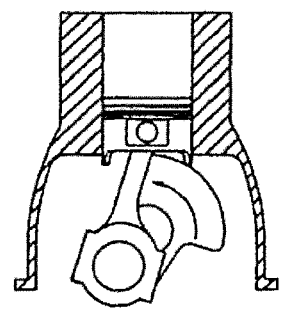

Illustrated in FIGS. 21a-21b is another representative embodiment 290 of the CRAM power linkage designated as "fixed lobe" due to the absence of a cam track altogether, and to the permanent coupling of the connecting rod to the crankshaft by means of the circular shaped lobe 292 and the bearing bore 296. Unlike the standard power throw, however, the lobe 292 of the fixed lobe CRAM can offset by approximately 13 degrees counterclockwise of the direction of crankshaft rotation, with the center of the lobe holding to the pitch line of the power throw 212. Furthermore, the connecting rod 216 can be slightly offset and arched to better induce force downward as the working piston 220 passes TDC.

During operation of the fixed lobe CRAM 290 (FIGS. 21c-21f), the fixed CRAM embodiment follows a normal sinusoidal path, as with a standard engine. No static dwell is possible as a result of this sinusoidal configuration, however, due to the lobe's 292 offset, the piston 220 itself does not reach TDC until after the crank 212 has passed its rotational TDC position. A short period of "near static" movement of the piston is gained. When the crank reaches +30 rotational position, the angle of the lobe from vertical is 18 degrees. The swag of the connecting rod 216 provides an additional 7 degrees for a total of 25 degrees, or 422 ft/lbs (out of a possible 1,000 ft/lbs, see FIG. 10). During this condition of "near static" dwell the mating of the connecting rod's 216 circular bore 296 to the fixed crankshaft lobe 292 offers a "near motionless" position of the piston relative to the distance to the top of the combustion chamber to facilitate the desired compression of the fuel/air mixture, prior to detonation.

Illustrated in FIGS. 22a-22c and 23a-23c are cross-sectional side views of the valve cams and valve assemblies of the IE engine, in accordance with another representative embodiment 300 of the present invention, which comprises a system and method for modifying the profile of the various valve cams 310 pressing against the valve lifters 304 to actuate the intake and exhaust valves 302.

Figures 22A, 22B, 22C:
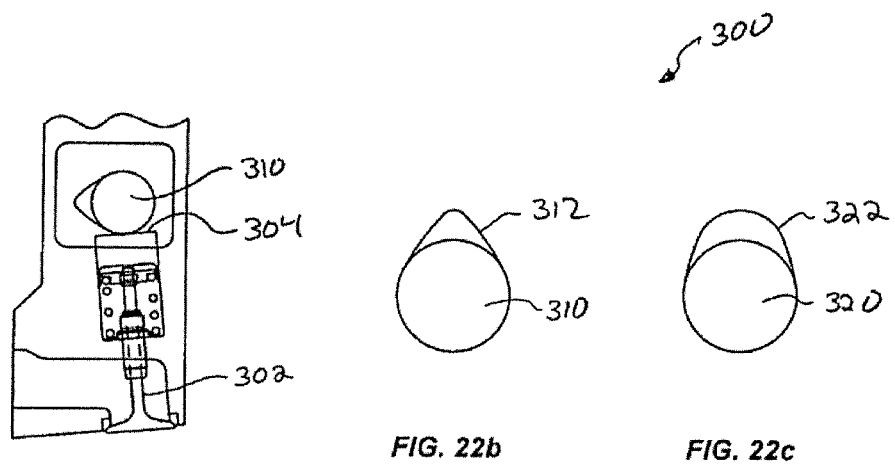
FIGS. 22a-22c together illustrate cross-sectional side views of the valve cams in accordance with a representative embodiment of the present invention.

The cam/valve assembly and cycloidal lobe profile of a standard IC engine valve cam are illustrated in FIGS. 22a and 22b, respectively. As can be appreciated by one skilled in the engine arts, the cycloidal lobe profile 312 is sharply peaked in order to transition from the circular surface to the lobe surface as quickly as possible while completely actuating (e.g. opening and closing) the inlet and/or exhaust valve 302 within the 180 degrees of the intake and/or exhaust stroke. Such a sharply peaked lobe profile generate high pressure angle and creates strong resistance force between the rotating cam and the valve lifters.

It has been observed that with the CRAM embodiment 200 of the IE engine depicted in FIGS. 14a-14b and 16a-16i, that the static dwell or pause in the linear motion of the working piston centered around TDC could also be used to extend the angular duration in which the exhaust and/or intake valves 302 could be actuated. This is because the static dwell in the linear travel of the working piston transpires at the TDC position between the exhaust and intake strokes, as well as the TDC position between the compression and power strokes. Consequently, the cycloidal lobe profile 312 of the valve cam 310 could be modified to extend the angular window in which a valve is open or alter the speed in which a valve opens or closes, thus modifying the valve sequencing to allow more than one valve to be open at one time.

Figures 23A, 23B, 23C:
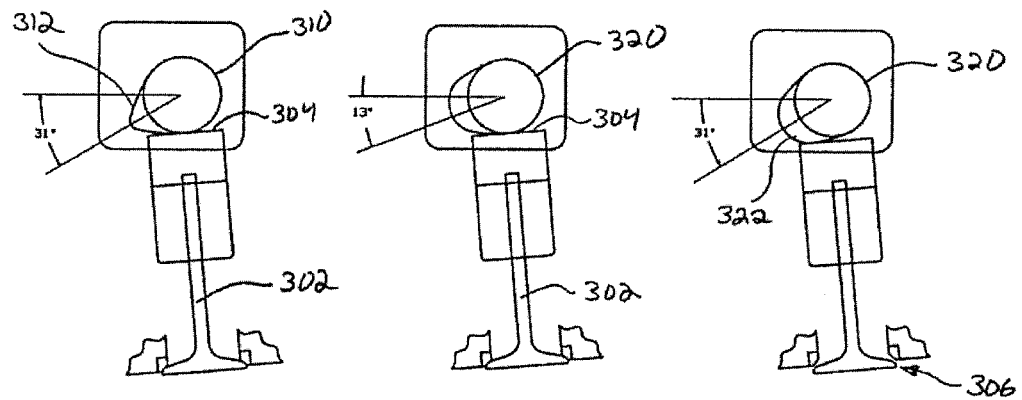
FIGS. 23a-23c together illustrate cross-sectional side views of the valve cams and valve assemblies, in accordance with the representative embodiment of FIG. 22.

A representative system modifying the cycloidal lobe profile 312 of FIG. 22b is the harmonic lobe profile 322 of FIG. 22c, based on the physics of the sine curve, and which employs a much rounder profile with lower pressure angles. One benefit of the harmonic lobe profile is illustrated in FIGS. 23a-23c, in which it can be observed that a lobe of this shape 322 first engages the valve lifter 304 at 13 degrees past horizontal (FIG. 22b), while the cycloidal lobe 310 does not engage until 31 degrees past horizontal (FIG. 23a). Thus, by the time the harmonic lobe 312 reaches the 31 degrees past horizontal position of the cycloidal lobe, the valve 302 has already been opened and gas is flowing into or out of the valve port 306. Such a valve timing opportunity, provided for by the CRAM linkage, can allow for improved flowrates and mixing of the gases entering and exiting the compression chamber of the IE engine. Additionally, "lighter-duty" components, such as springs, may be substituted, thus reducing stress and wear to the camshaft and related systems.

The foregoing detailed description describes the invention with reference to specific representative embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative representative embodiments of the invention have been described herein, the present invention is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed and desired to be secured by Letters Patent is:

1. A piston-powered internal explosion engine for providing power output through a rotating crankshaft having at least one power crank with a lobe, wherein said lobe comprises an arch surface and a concentric surface, said internal explosion engine comprising:

an engine block having a power cylinder formed therein for receiving a working piston, wherein said piston is adapted to linearly displace in correspondence with a rotation of said power crank;

a connecting rod operably coupled to said power crank and configured to transfer power from said working piston to rotate said crankshaft, said working piston being supported within said power cylinder and operably coupled to said power crank, wherein an arch surface of a hub of said connecting rod interacts with said arch surface of said crank lobe during rotation of said crank, and wherein during said interaction, said linear displacement of said piston is held momentarily static to provide a dwell while said crank continues to rotate through a range of angular positions; and a compression chamber defined at least in part by a head end of said working piston adjacent a cylinder head, said working piston being configured to receive power from an explosion of a detonated compressed volume of air/fuel mixture located substantially within said compression chamber and to transfer the received power to said connecting rod, wherein said compressed volume of air/fuel mixture is held substantially constant, and a desired compression ratio maintained, from an angular position of said rotating crankshaft of at least 20 degrees prior to a top dead center position of said working piston during a compression stroke, to an angular position of at least 20 degrees after said top dead center position of said working piston during a power stroke, and prior to detonation, to facilitate an explosive, rapid expansion reaction at the time of said explosion.

2. The explosion engine of claim 1, wherein a volume ratio of said compression chamber varies in accordance with, at least in part, said angular position of said rotating crankshaft and a corresponding linear position of said working piston, said variable volume ratio being held substantially constant through a range of angular positions of said rotating crankshaft that include said top dead center position of said working piston, said variable volume ratio being graphically represented by a truncated sinusoidal pattern.

3. The explosion engine of claim 1, further comprising:
a floating piston cylinder in fluid communication with said power cylinder;
a floating piston adapted to travel within said floating piston cylinder in response to various pressures within said compression chamber; and
a biasing element adapted to bias said floating piston toward a sealing position, wherein said floating piston seals said compression chamber and said floating piston cylinder, said floating piston separating said floating piston cylinder from said power cylinder, wherein, during said compression stroke of said working piston, said floating piston is caused to displace in response to a threshold pressure within said compression chamber reached at said desired compression ratio, which said threshold pressure overcomes said biasing element causing at least a portion of said air/fuel mixture to shift into said floating piston cylinder, and wherein, during said power stroke of said working piston, said biasing element urges said floating piston toward said sealing position, thus causing at least a portion of said air/fuel mixture to shift back into said power cylinder prior to said detonation.

4. The explosion engine of claim 1, further comprising:
a cam surface formed on a journal of said power crank; and
a follower surface formed on said connecting rod, wherein a moving interactive relationship between said cam surface and said follower surface retains said working piston at an uppermost position of linear travel between said angular positions of said crankshaft, in which a dead space volume is established between said cylinder head and said working piston.

5. The explosion engine of claim 4, wherein said power cylinder comprises a head having a hemispherical upper surface at least partially defining said dead space volume.

6. The explosion engine of claim 4, wherein said cam surface is truncated along a pitch line of said power crank and said follower surface defines a pitch line of said connecting rod pivoting about said working piston at a topmost position of linear travel.

* * * * *